US010791533B2

(12) United States Patent
Zou et al.

(10) Patent No.: US 10,791,533 B2
(45) Date of Patent: Sep. 29, 2020

(54) METHODS AND SYSTEMS FOR GENERALIZED RACH-LESS MOBILITY

(71) Applicant: Huawei Technologies Co., Ltd., Shenzhen (CN)

(72) Inventors: Jialin Zou, Randolph, NJ (US); Yongxia Lyu, Ottawa (CA); Hua Xu, Ottawa (CA); Liqing Zhang, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 16/415,910

(22) Filed: May 17, 2019

(65) Prior Publication Data

US 2020/0029292 A1  Jan. 23, 2020

Related U.S. Application Data

(60) Provisional application No. 62/700,719, filed on Jul. 19, 2018.

(51) Int. Cl.
*H04W 56/00* (2009.01)
*H04W 72/04* (2009.01)
(Continued)

(52) U.S. Cl.
CPC ...... *H04W 56/0045* (2013.01); *H04B 7/0695* (2013.01); *H04L 1/0003* (2013.01); *H04L 1/0009* (2013.01); *H04W 24/10* (2013.01); *H04W 36/0005* (2013.01); *H04W 36/18* (2013.01); *H04W 36/30* (2013.01); *H04W 56/001* (2013.01); *H04W 56/0005* (2013.01); *H04W 72/046* (2013.01);
(Continued)

(58) Field of Classification Search
CPC .......... H04W 56/0045; H04W 56/001; H04W 56/0005; H04W 36/18; H04W 36/0005; H04W 36/30; H04W 36/0083; H04W 36/0072; H04W 76/27; H04W 76/11; H04W 24/10; H04W 72/046; H04W 16/28; H04L 1/0009; H04L 1/0003; H04L 1/0023; H04B 7/0695
See application file for complete search history.

(56) References Cited

U.S. PATENT DOCUMENTS

2019/0132066 A1\* 5/2019 Park .................. H04W 16/28
2019/0281571 A1  9/2019 Ren et al.
(Continued)

FOREIGN PATENT DOCUMENTS

CN   106817762 A   6/2017
CN   108024259 A   5/2018
(Continued)

*Primary Examiner* — Joshua Kading
(74) *Attorney, Agent, or Firm* — Slater Matsil, LLP

(57) ABSTRACT

In accordance to embodiments, a user equipment (UE) may receive, from the source base station, a beam information message comprising beam associated information. The beam associated information may indicate a plurality of beam identifiers (IDs) corresponding to a plurality of beams in the target base station and a plurality of default timing advance (TA)s. Each default TA of the plurality of TAs is associated with one beam of the plurality of beams in the target base station and additional related configurations.

78 Claims, 11 Drawing Sheets

(51) Int. Cl.
  *H04W 36/18* (2009.01)
  *H04W 36/00* (2009.01)
  *H04B 7/06* (2006.01)
  *H04W 76/27* (2018.01)
  *H04L 1/00* (2006.01)
  *H04W 24/10* (2009.01)
  *H04W 76/11* (2018.01)
  *H04W 36/30* (2009.01)
  *H04W 16/28* (2009.01)

(52) U.S. Cl.
  CPC ............ *H04W 76/11* (2018.02); *H04W 76/27* (2018.02); *H04W 16/28* (2013.01)

(56) References Cited

U.S. PATENT DOCUMENTS

| | | | |
|---|---|---|---|
| 2020/0084683 A1* | 3/2020 | Moosavi | H04W 36/24 |
| 2020/0092685 A1* | 3/2020 | Fehrenbach | H04B 7/15507 |
| 2020/0106647 A1* | 4/2020 | Chen | H04L 5/0051 |
| 2020/0119778 A1* | 4/2020 | Grant | H04L 5/0053 |
| 2020/0128412 A1* | 4/2020 | Kazmi | H04W 36/0085 |

FOREIGN PATENT DOCUMENTS

| | | |
|---|---|---|
| CN | 108024325 A | 5/2018 |
| WO | 2017185231 A1 | 11/2017 |

\* cited by examiner

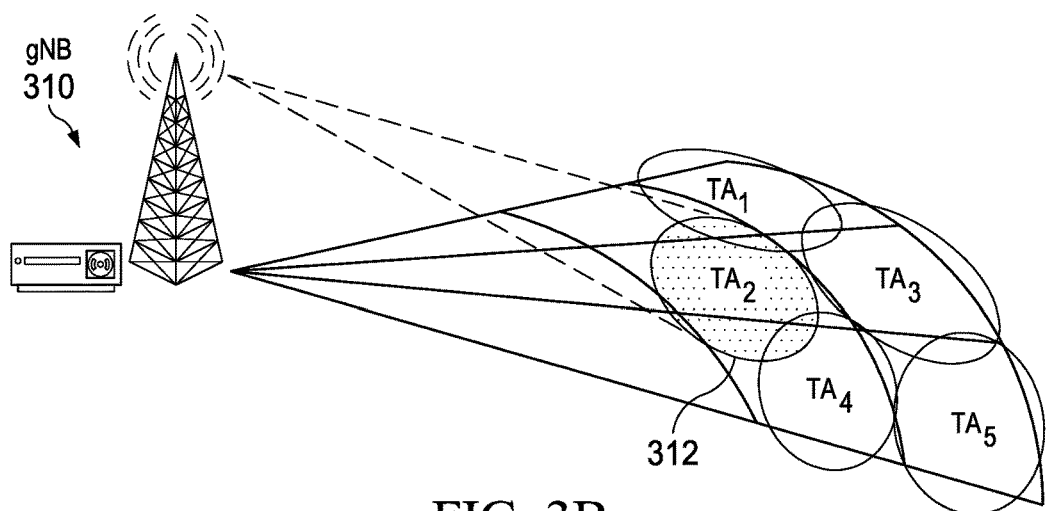
FIG. 3B
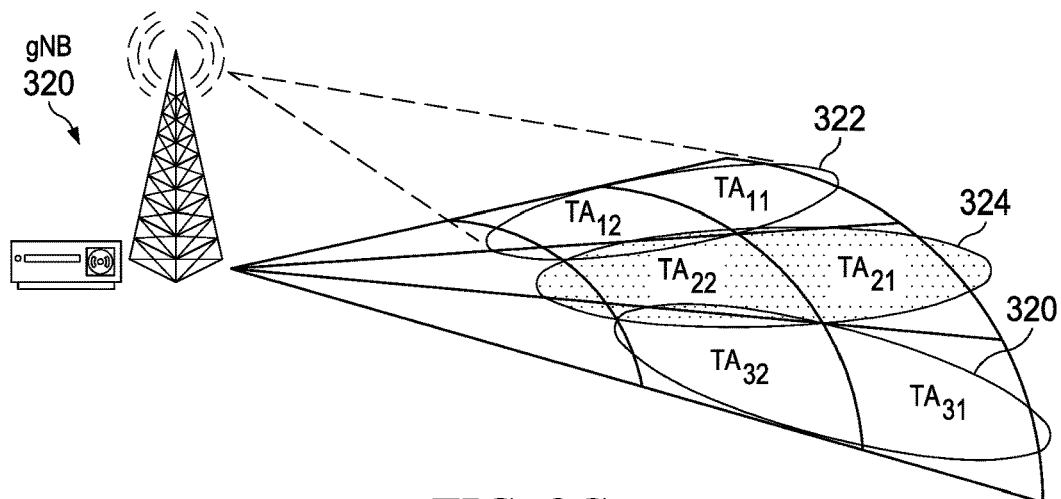
FIG. 3C
| SOURCE BEAMS | TARGET BEAMS | | | | |
|---|---|---|---|---|---|
| | Beam1 | Beam2 | Beam3 | Beam4 | Beam5 |
| Beam1 | | TA_12 | TA_13 | TA_14 | |
| Beam2 | TA_21 | | | | |
| Beam3 | TA_31 | | | | |
| Beam4 | TA_41 | | | | TA_45 |
| Beam5 | | | | TA_54 | |
FIG. 3E

METHODS AND SYSTEMS FOR GENERALIZED RACH-LESS MOBILITY

This application claims priority to U.S. Provisional Patent Application No. 62/700,719 filed Jul. 19, 2018, which application is hereby incorporated herein by reference in its entirety.

TECHNICAL FIELD

The present disclosure relates generally to wireless communications and, in particular, to methods and systems for generalized random-access channel (RACH)-less mobility.

BACKGROUND

A random-access channel (RACH) is a shared transport-layer access channel used by user equipments (UEs) to access a wireless network for operations such as call setup and bursty data transmission.

For a UE's mobility among different non-collocated nodes, such as gNBs or transmission points (TRPs), a RACH-based random access procedure is normally required for the UE to handover (HO) from a source node to a target node. The RACH-based random access procedure could cause significant delays. For example, since RACH is shared, it is possible that multiple UEs transmit at the same time, and these transmissions collide in the medium. So, the colliding UEs would not be granted access to the network. In some systems, the RACH-based random access procedure may take about 8 ms latency during the HO. A more efficient technique for eliminating or reducing the delay caused by the RACH is desirable, particularly for improvement of the performance of UE mobility.

SUMMARY OF THE INVENTION

Technical advantages are generally achieved, by embodiments of this disclosure which describe methods and systems for multiple beam based communications.

In accordance with embodiments, a user equipment (UE) may receive, from the source base station, a beam information message comprising beam associated information. The beam associated information may indicate a plurality of beam identifiers (IDs) corresponding to a plurality of beams in the target base station and a plurality of default timing advance (TA)s. Each default TA of the plurality of TAs is associated with one beam of the plurality of beams in the target base station and additional related configurations. A UE, based on the received per beam associated TA(s) and other configurations of the candidate beams, performs generalized RACH-less mobility with which the UE conducts RACH-less access to the target beam (of the target cell) in normal mobility scenarios.

In accordance with embodiments, a UE receives, from the source base station, a beam information message comprising beam associated information. The beam associated information indicates a plurality of beam identifiers (IDs) corresponding to a plurality of beams in the target base station, a plurality of default timing advance (TA) groups, and a plurality of additional related configuration sets. Each default TA group of the plurality of default TA groups is associated with a beam of the plurality of beams in the target base station and an additional related configuration set of the plurality of the additional related configuration sets.

The UE transmits, to the target base station without performing random access by the UE to the target base station, an uplink (UL) transmission with a TA adjustment based on a target beam of the plurality of beams in which the UE is located and a first additional related configuration set of the plurality of additional related configuration sets. The TA adjustment is based on a first default TA of a first default TA group associated with the target beam, and the first additional related configuration set is associated with the first default TA.

In some embodiments, the first default TA group associated with the target beam comprises a set of default TAs. Each one of the set of the default TAs corresponds to a beam in the source base station. The UE determines the first default TA based on the target beam and the source beam in the source base station in which the UE is located and the UE is connected with the source base station through the source beam. In some embodiments, the first default TA is the only TA in the first default TA group. In some embodiments, TAs in the plurality of default TA groups are obtained by the target base station by collecting previous TAs used in previous successful handovers.

In some embodiments, the UE may select the target beam from one or more candidate beams for access. The UE may determine the first default TA for RACH-less access in the target beam based on a beam ID associated with the target beam and the beam associated information in the beam information message.

In some embodiments, the beam information message is transmitted based on RRC signaling or layer one (L1) signaling. The beam information message may comprise one of an RRC connection reconfiguration message configured as a handover (HO) command, or a PSCell activation message. In some embodiments, a beam ID of the plurality of beam IDs may be one of a SSB ID, or a channel state information (CSI)-reference signal (RS) ID.

In accordance to embodiments, the target base station transmits, to the source base station, beam associated information. The beam associated information indicates a plurality of beam identifiers (IDs) corresponding to a plurality of beams in the target base station, a plurality of default timing advance (TA) groups, and a plurality of additional related configuration sets. Each default TA group of the plurality of default TA groups is associated with a beam of the plurality of beams in the target base station and an additional related configuration set of the plurality of the additional related configuration sets.

The target based station receives, from a user equipment (UE) without performing random access by the UE, an uplink (UL) transmission with a TA adjustment based on a target beam of the plurality of beams in which the UE is located and a first additional related configuration set of the plurality of additional related configuration sets. The TA adjustment is based on a first default TA of a first default TA group associated with the target beam. The first additional related configuration set is associated with the first default TA.

In some embodiments, the first default TA group associated with the target beam may comprise a set of default TAs. Each one of the set of the default TAs corresponds to a beam in the source base station. The first default TA is determined based on the target beam and a source beam in the source base station in which the UE is located and connected with the source base station.

In some embodiments, the first default TA is the only TA in the first default TA group. In some embodiments, TAs in the plurality of default TA groups are obtained by the target base station by collecting previous TAs used in previous successful handovers.

In some embodiments, the UE may select the target beam from one or more candidate beams for access and determine a default TA for RACH-less access in the target beam based on a beam ID associated with the target beam and the beam associated information in a beam information message transmitted from the source base station to the UE.

In some embodiments, a beam information message may be transmitted from the source base station to the UE in one of a handover (HO) request acknowledgement message or a PSCell addition acknowledgement message to the source base station.

In some embodiments, the first additional related configuration set may comprise at least one of a cyclic prefix (CP) configuration, a UL transmission power configuration, a time-frequency UL transmission resource configuration, one or more demodulation reference signal (DMRS) configurations, or one or more modulation coding scheme (MCS) configurations.

In some embodiments, a beam ID of the plurality of beam IDs may be one of a SSB ID, or a channel state information (CSI)-reference signal (RS) ID.

In accordance to embodiments, the source base station may receive, from the target base station, beam associated information. The beam associated information indicates a plurality of beam identifiers (IDs) corresponding to a plurality of beams in the target base station, a plurality of default timing advance (TA) groups, and a plurality of additional related configuration sets. Each default TA group of the plurality of default TA groups is associated with a beam of the plurality of beams in the target base station and an additional related configuration set of the plurality of the additional related configuration sets.

The source base station transmits, to a user equipment (UE), a beam information message comprising the beam associated information. The UE, without performing random access, transmits to the target base station, an uplink (UL) transmission with a TA adjustment based on a target beam of the plurality of beams in which the UE is located and a first additional related configuration set of the plurality of additional related configuration sets. The TA adjustment is based on a first default TA of a first default TA group associated with the target beam. The first additional related configuration set is associated with the first default TA.

In some embodiments, the first default TA group associated with the target beam may comprise a set of default TAs. Each one of the set of the default TAs may correspond to a beam in the source base station. The first default TA may be determined based on the target beam and a source beam in the source base station in which the UE is located and connected with the source base station. In some embodiments, the first default TA is the only TA in the first default TA group.

In some embodiments, TAs in the plurality of default TA groups may be obtained by the target base station by collecting previous TAs used in previous successful handovers.

In some embodiments, the UE may select the target beam from one or more candidate beams for access and determine a default TA for RACH-less access in the target beam based on a beam ID associated with the target beam and the beam associated information in the beam information message.

In some embodiments, the beam information message is transmitted based on RRC signaling or layer one (L1) signaling. In some embodiments, the beam information message may comprise in one of an RRC connection reconfiguration message configured as a handover (HO) command, or a PSCell activation message.

In some embodiments, the first additional related configuration set may comprise at least one of a cyclic prefix (CP) configuration, a UL transmission power configuration, a time-frequency UL transmission resource configuration, one or more demodulation reference signal (DMRS) configurations, or one or more modulation coding scheme (MCS) configurations. In some embodiments, the beam ID is one of a SSB ID, or a channel state information (CSI)-reference signal (RS) ID.

In accordance with embodiments, a UE transmits a UE uplink (UL) reference signal. The UE receives, from the target base station, a beam information message. The beam information message comprises beam associated information. The beam associated information indicates a beam identifier (ID) corresponding to a target beam in the target base station, a real-time timing advance (TA) associated with the target beam, and an additional related configuration set. The real-time TA is determined by the target base station based on the UE UL reference signal. The additional related configuration set is associated with the real-time TA.

The UE transmits, to the target base station without performing random access by the UE to the target base station, a UL transmission with a TA adjustment based on the target beam in which the UE is located and the additional related configuration set in the beam associated information, The TA adjustment is based on the real-time TA associated with the target beam assigned by the target base station to the UE.

In some embodiments, the UE UL reference signal is transmitted to the source base station and listened to by the target base station with configuration of the UE UL reference signal being pre-informed to the target base station.

In some embodiments, the beam information message may be transmitted based on RRC signaling or layer one (L1) signaling. In some embodiments, the beam information message may comprise one of an RRC connection reconfiguration message configured as a handover (HO) command, or a PSCell activation message.

In some embodiments, the additional related configuration set may comprise at least one of a cyclic prefix (CP) configuration, a UL transmission power configuration, a time-frequency UL transmission resource configuration, one or more demodulation reference signal (DMRS) configurations, or one or more modulation coding scheme (MCS) configurations. In some embodiments, The beam ID may be one of a SSB ID, or a channel state information (CSI)-reference signal (RS) ID.

In accordance with embodiments, the target base station receives, from a user equipment (UE), a UE uplink (UL) reference signal. The target base station transmits, to the UE, a beam information message. The beam information message comprises beam associated information. The beam associated information indicates a beam identifier (ID) corresponding to a target beam in the target base station, a real-time timing advance (TA) associated with the target beam, and an additional related configuration set. The real-time TA is determined by the target base station based on the UE UL reference signal. The additional related configuration set is associated with the real-time TA.

The target base station receives, from the user equipment (UE) without performing random access by the UE, a UL transmission with a TA adjustment based on the target beam in which the UE is located and the additional related configuration set in the beam associated information, The TA adjustment is based on the real-time TA associated with the target beam assigned by the target base station to the UE.

In some embodiments, the UE UL reference signal may be transmitted to the source base station and listened to by the target base station with configuration of the UE UL reference signal being pre-informed to the target base station.

In some embodiments, the beam information message may be transmitted based on RRC signaling or layer one (L1) signaling. In some embodiments, the beam information message may comprise one of an RRC connection reconfiguration message configured as a handover (HO) command, or a PSCell activation message.

In some embodiments, the additional related configuration set may comprise at least one of a cyclic prefix (CP) configuration, a UL transmission power configuration, a time-frequency UL transmission resource configuration, one or more demodulation reference signal (DMRS) configurations, or one or more modulation coding scheme (MCS) configurations. In some embodiments, the beam ID may be one of a SSB ID, or a channel state information (CSI)-reference signal (RS) ID.

Apparatuses, as well as computer program products, for performing the methods are also provided.

BRIEF DESCRIPTION OF THE DRAWINGS

For a more complete understanding of the present invention, and the advantages thereof, reference is now made to the following description taken in conjunction with the accompanying drawings, in which:

FIG. 3B illustrates example TAs associated with beams sweeping horizontally and vertically;

FIG. 3C illustrates example TAs associated with beams sweeping horizontally only;

FIG. 3E shows a table that helps identify a default TA based on the source beam and the target beam;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
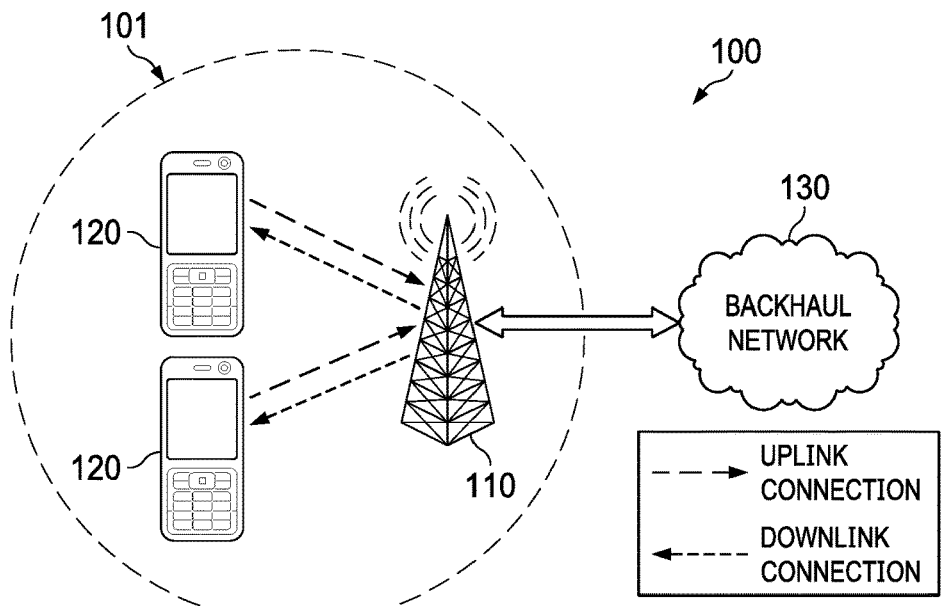
FIG. 1 is a diagram of an embodiment wireless communications network.

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. These and other inventive aspects are described in greater detail below.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

In conventional wireless systems, such as long term evolution (LTE) systems, RACH-less handover (HO) may be supported only in very limited corner conditions: either the timing advance (TA) equals 0, or the TA of a neighboring cell is the same as the TA of the serving cell. In LTE, with conventional techniques, the cell sizes normally are large, and the cell sizes can be very different across different cells. Therefore, in conventional wireless systems, these corner conditions for RACH-less HO are rarely satisfied in most of the common mobility scenarios. Since the cell size can be large, the TA for a UE to conduct an uplink (UL) transmission usually has to be obtained by a RACH-based random access procedure in real time during the HO. In addition, the UL initial data transmission power after the random access procedure also relies on the same random access process with the related procedure (e.g., the ramping up procedures to get the right transmission power). So, RACH-based random access procedures cannot be avoided in the common conventional mobility scenarios. The RACH-based random access procedures for HO increase the overall latency of a HO process. With the increased latency, it is often not acceptable in joint transmissions among multiple non-collocated TRPs with UE mobility. The latency caused by the RACH-based random access procedures for HO is also not acceptable to meet the ultra-reliable low latency communication (URLLC) requirements for high speed UEs.

To solve this technical problem, this disclosure provides a technical solution. In some embodiments, a user equipment (UE) may receive, from the source base station, a beam information message comprising beam associated information. The beam associated information may indicate a plurality of beam identifiers (IDs) corresponding to a plurality of beams in the target base station and a plurality of default timing advance (TA)s. Each default TA of the plurality of TAs is associated with one beam of the plurality of beams in the target base station and additional related configurations. Similarly, the configuration of UL initial transmission power corresponding to the beam coverage can also be pre-determined and pre-configured for the UE. In so doing, obtaining the TA and UL initial transmission power in real time through random access can be avoided. The disclosed technique provides an efficient way for eliminating or reducing the delay caused by the RACH-based random access procedures. For example, in UE mobility (handover) situations, the disclosed technique improves the performance of UE mobility and utilization of wireless network resources.

FIG. 1 is a diagram of a network 100 for communicating data. The network 100 comprises a base station 110 having a coverage area 101, a plurality of user equipments (UEs) 120, and a backhaul network 130. As shown, the base station 110 establishes uplink (dashed line) and/or downlink (dotted line) connections with the UEs 120, which serve to carry data from the UEs 120 to the base station 110 and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as a "Node B," an enhanced Node B (eNB), a next generation Node B (gNB), a transmit/receive point (TRP), a macro-cell, a femtocell, a Wi-Fi access point (AP), and other wirelessly enabled devices. Base stations may provide wireless access in accordance with one or more wireless communications protocols, e.g., 5th generation "New Radio" (NR), Long Term Evolution (LTE), LTE Advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

The new radio (NR) introduces the multi-beam operation, and the coverage area of a beam is much smaller than the coverage area of a cell. The smaller beam coverage area provides the opportunity to use a default TA for the beam coverage area without the need to rely on the RACH-based random access procedure to measure and obtain the TA for a UE moving into this beam coverage area. This disclosure provides techniques for achieving RACH-less mobility or HO. For delay sensitive UEs as a part of the UCNC effort, it is desirable to avoid RACH-based random access procedures in a handover process in order to meet the NR URLLC requirements during the UE mobility. Particularly, for multi-TRP joint operation/transmission, RACH-less mobility may be critical for seamless mobility among multiple non-collocated nodes/TRPs with non-ideal backhaul.

The timing advance (TA) is driven by the round trip delay (RTD) of a UE at a specific location. So, the TA used by a UE is location dependent. The small coverage area of a beam/TRP is fixed as long as the transmission beam direction and power are fixed.

The delta difference of the exact TAs at different locations within the same small coverage of a beam/TRP can be considered small enough, which is within the difference that can be covered or tolerated by the cyclic prefix (CP). In 3GPP, 5 types of sub-carrier spacing are specified: 15 kHz, 30 kHz, 60 kHz, 120 kHz, and 240 kHz.

TABLE 1

| μ | $\Delta f = 2^\mu *$ 15 [kHz] | Cyclic prefix | Equivalent distance |
|---|---|---|---|
| 0 | 15 | 5.2 us | 1.6 km |
| 2 | 60 | 1.3 us | 400 m |
| 4 | 240 | 0.32 us | 100 m |

Table 1 shows several example CPs of 7.8% overhead. For example, for the sub-carrier spacing of 60 kHz, as long as the radius of the beam/TRP coverage area is less than 200 m (RTD), the timing inaccuracy offset (between the default TA and the actual TA) at any location within the coverage area of the beam/TRP can be covered by the CP.

Figure 2:
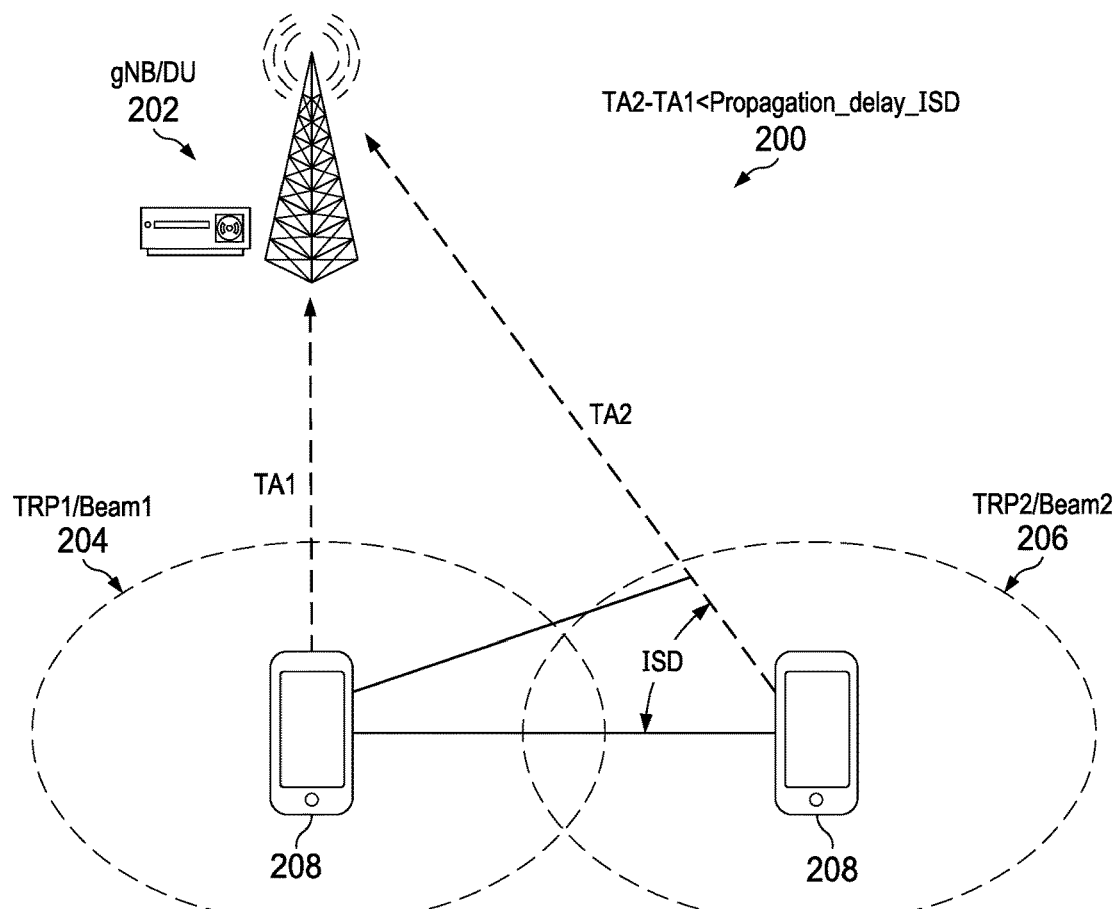
FIG. 2 illustrates a diagram of the timing offset between the two TAs of two neighboring beams in a network, according to some embodiments.

For the beams much far away from the antenna arrays, the timing offset between the neighboring beams can be much less than the diameter of the beam coverage area. FIG. 2 illustrates a diagram of the timing offset between the two TAs of two neighboring beams in a network 200, according to some embodiments. In the network 200, the gNB 202 serves two neighboring beams 204 and 206. In the majority of the cases, the timing offset between TA1 (for the UE 208 in the beam 204) and TA2 (for the UE 208 in the beam 206) is less than the CP associated with the inter-site distance (ISD). The worst case scenario is the propagation delay of the ISD (e.g., the extreme case where the gNB is located at the center of one of the TRP coverage area and close to the ground). For the UE 208 at any location in the coverage area of the beam 204 using TA1, the inaccuracy should be within the CP. This is particularly true for the scenarios where the serving beams 204 and 206 are quite far from the gNB 202.

In short, as long as the beam coverage area is within the CP allowed, the default TA of the beam can be accurate enough. In some embodiments, extended CP (ECP) may be used to overcome the inaccuracy of the beam associated default TA assigned by the network. A valid default TA can be associated with a beam and applied to a UE for the UE's UL transmission within the beam's coverage. The beam associated default TA can be pre-configured to a UE without the need of the RACH-based random access procedure.

Figure 3A:
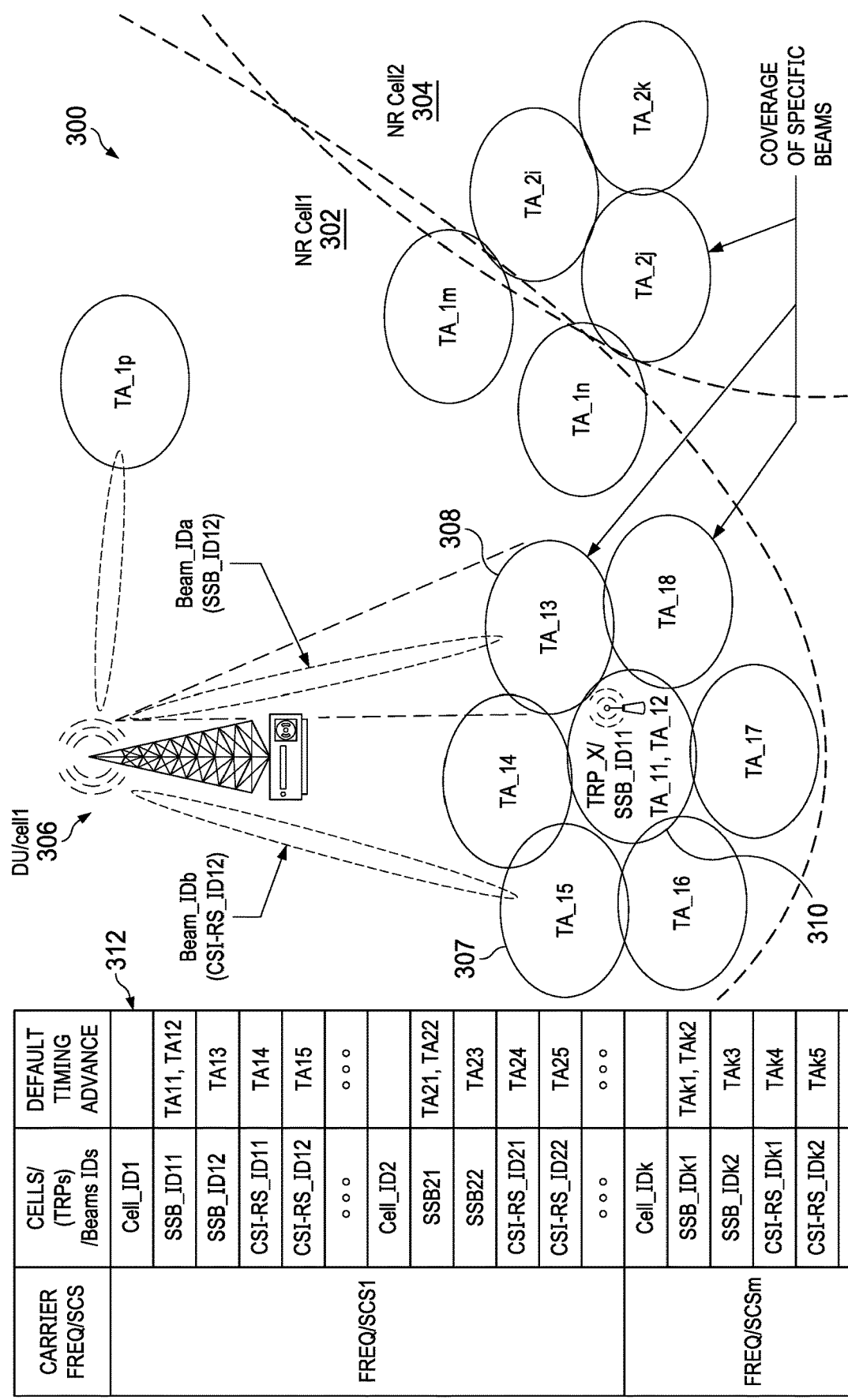
FIG. 3A illustrates beam associated data and coverage areas of beams/TRPs of two neighboring cells, according to some embodiments.

FIG. 3A illustrates beam associated data 312 and coverage areas of beams/TRPs of two neighboring cells, the NR Cell1 302 and the NR Cell2 204, in a network system 300, according to some embodiments. Base station 306 serves NR Cell1 302, which includes multiple beam coverage areas, such as beam coverage areas 307 and 308. NR Cell1 302 may additionally include coverage area served by one or more non-collocated TRPs, each TRP may have one or more beams, such as coverage area 310. Each beam can be identified by its reference signal ID. For example, the ID of the reference signal of beam 307, CSI-RS_ID12, is used to identify the beam 307 and ID of the reference signal of beam 308, SSB_ID12, is used to identify beam 308. Each beam/TRP coverage area is associated with one or more corresponding default TAs, as shown in table 312. For example, the beam coverage area 308 is associated with the default TA_13, and a UE in the beam coverage area 308 may use the default TA_13 for UL transmission to base station 306. Another example is at the TRP/beam coverage area 310 with a beam which is identified by SSB_ID11. In this example, the TRP can decode the UE transmitted signals with the timing advance either TA11 or TA 12. When a UE is in the coverage of beam SSB_ID11 of the TRP, it can pick one of the TAs for its transmission. The default TAs and beam identifiers (IDs) associated with the coverage areas (as indicated in table 312) in the UE predicted mobility path may be sent the UE before or during the handovers (if the UE is in the RRC connected mode) or before the resume and direct data transmission (if the UE is in the inactive mode) occur.

The disclosed technique may include three phases. The first phase is the initial set up phase. In some embodiments, a default TA of a small TRP/beam coverage area can be pre-determined by the network through the drive test during the initial deployment. The default TA may further be derived by collecting the actual TAs applied over the time at a beam coverage. The fixed default value can be used for the small TRP/beam coverage area of a specific location. The default TA value can be adaptively updated/optimized over the time based on the actual offset of the received signals to the local reference signals at the UL receivers. For example, the optimized default TA can be determined over the time such that the average offset between the received signal and local reference is minimized.

The second phase is the pre-configuration phase. In the second phase, the network (e.g., a base station) may generate and maintain a global lookup table with entries of different carrier frequencies/sub-carrier spacings (SCSs), cell ID, SSB_ID, CSI-RS_ID for TA adjustments. The network may maintain a global table of pre-determined parameters (such as TAs, UL transmission power configurations, initial PUSCH transmission grant) associated with beams in the database. For supporting UE mobility, a small list of pre-determined parameters corresponding to candidate beam(s) on the predicted UE traveling route may be sent to the UE via a dedicated radio resource control (RRC) message (e.g., an RRCReconfiguration message). In some embodiments, the parameters in the RRCReconfiguration message may include following:

The TA(s) associated with a HO target beam(s), identified by carrier frequencies/SCSs, cell ID, SSB_ID, CSI-RS_ID of the candidate beams at the target node;

The target beam associated initial transmission power configuration, CP configuration, and modulation coding scheme (MCS) configurations; and Grant of initial transmission.

In the third phase, the UE may receive the pre-configured default TA of a HO target beam to facilitate RACH-less mobility access. An RRC message (e.g., an RRCReconfiguration message) can be used for the UE to receive the TA, the UL initial data transmission power configuration, and the initial UL transmission resource grant to the UE. In some embodiments, for beams most often passed by UEs, the associated default TAs, the UL initial data transmission power configurations, and the UL resource grants may be broadcasted over the broadcast channel for common usage. Details of these three phases are described below.

In the first phase, the initial beam associated TA values may be obtained through the drive test during the initial deployment. The initial drive test is an existing practice of deployment for radio configuration tuning and data collecting. The network may collect the TAs during the drive test via many air interface nodes (e.g., base stations). The network can also collect data by conducing more focused drive tests at the coverage border areas. The network may adaptively obtain optimized default TA values associated with beams' specific coverage spots. The network can collect the TAs applied to the UEs under the coverage of a beam. The network may obtain the remaining timing offset of the received signals with the local timing reference after the new TA is applied to the UE. In one embodiment, the network may determine a new TA to minimize the average remaining timing offset. The new TA can be a long term average of the real TAs applied to individual UEs in the beam coverage area. The change of long term filtered TA versus the change of the long term filtered remaining timing offset may be used as the guidance for determine the next update of the default TA The TA sampling values by the network may be from many different UEs passed the beam coverage area over an enough long time. In one embodiment, the default TA may only be used for the initial RACH-less UL data transmission.

In some embodiments, for the default TA learning and optimization by the network, the network may measure the access preamble associated with a beam. In addition, when the UE is in the RRC connected mode, the network may determine the best TA for the UE in the beam coverage area by measuring the UE transmitted sounding reference signal (SRS) or the demodulation reference signal (DMRS).

In some embodiments, to obtain the TA in real time, the conventional RACH-based access procedure may be used. In other embodiments, cross listening schemes may be applied. For example, in the UL measurement based HO, after the target node is pre-configured, UE may be triggered to send reference signals specifically tuned towards the target cell, which may include the periodicity, the power, and the direction. The sequence pattern of the reference signal may be pre-configured to the target node. In another example, the target node may be pre-configured to listen to the UE reference signals sent to the source node.

The above embodiments describes how the network obtains the default TA associated with a beam for the fix beam coverage area. After obtaining the default TAs and other beam associated configurations, the RACH-based random access procedure is not needed to real time determine the TA for mobility later on. The pre-determined default TA allows the TRP/beam operation to directly use the default TA associated with the beam whenever needed.

In the second phase, after the network obtains the default TAs associated with the beams in the first phase, the network may generate and maintain a global lookup table of pre-determined TAs and other parameters associated with the corresponding beams in the database. The network may continue updating the parameters based on the latest measurement.

TABLE 2

| Carrier freq/SCS | Cells/(TRPs)/ | Beams | Default Timing Advance | CP Config | UL Initial TX Power Config | MCS Type (table ID) |
|---|---|---|---|---|---|---|
| Freq/SCS1 | Cell_ID1 | SSB_ID11 | TA11, TA12 | ECP | Ptx_init_config_11 | MCS Type1 |
| | | SSB_ID12 | TA13 | ECP | Ptx_init_config_12 | MCS Type2 |
| | | CSI-RS_ID11 | TA14 | NCP | Ptx_init_config_13 | MCS Type3 |
| | | CSI-RS_ID12 | TA15 | NCP | Ptx_init_config_14 | MCS Type3 |
| | | ... | ... | ... | ... | ... |
| | Cell_ID2 | SSB_ID21 | TA21, TA22 | ECP | Ptx_init_config_21 | MCS Type1 |
| | | SSB_ID22 | TA23 | NCP | Ptx_init_config_22 | MCS Type2 |
| | | CSI-RS_ID21 | TA24 | NCP | Ptx_init_config_23 | MCS Type1 |
| | | CSI-RS_ID22 | TA25 | NCP | Ptx_init_config_24 | MCS Type3 |
| | | ... | ... | ... | ... | |
| Freq/SCSm | Cell_Idk | SSB_IDk1 | TAk1, TAk2 | NCP | Ptx_init_config_k1 | MCS Type1 |
| | | SSB_IDk2 | TAk3 | NCP | Ptx_init_config_k2 | MCS Type2 |
| | | CSI-RS_IDk1 | TAk4 | NCP | Ptx_init_config_k3 | MCS Type1 |
| | | CSI-RS_IDk2 | TAk5 | NCP_k4 | Ptx_init_config_k4 | MCS Type2 |
| | | ... | ... | ... | ... | ... |

Table 2 shows an embodiment lookup table format and data associated with different beams. For supporting the UE mobility, a small list of parameters (i.e., a subset of rows in Table 2) corresponding to candidate beams on the UE's predicted traveling route may be sent to the UE via a dedicated RRC message (e.g. an RRCReconfiguration message).

As shown in Table 2, to achieve RACH-less mobility, there may be other parameters that also need to be pre-determined and configured for the UE. For example, the UE UL initial data transmission power at the target cell can be pre-configured and sent to the UE. The open loop power control mechanism may be used to determine the initial data transmission power (Ptx_init) based on the measurement of downlink (DL) reference signals of the HO target beam and per cell/beam based configurations. The example conceptual formula can be as follows:

$$Ptx\_init = \min\{P\_max, P0 + 10 \times \log(M) + \alpha \times PL + \Delta\_mcs\}$$

In the above formula, P0 is the power to be contained in one PRB. It is cell/beam specific parameter and is in dBm/PRB. M is the number of allocated Physical Resource Blocks (PRBs) per user. α is the path loss compensation factor. It is a cell specific parameter. PL is the estimated uplink path loss at the UE. The UE makes the estimation of path loss based on the measurement of the DL reference signal from the target beam of the target cell. Δ_mcs is the MCS dependent offset. It is UE specific and dependent to the MCS configuration.

As is shown in Table 2, the UL data initial transmission power configuration parameters are contained in the configuration element Ptx_init_config associated with each beam, which contains, for example, P0, M, α, Δ_mcs.

The initial data transmission power (Ptx_init) may further be conservatively adjusted based on historical statistics and recent load. The UL measurement based mobility may help to reduce the signaling overhead for RACH-less mobility.

In addition, in some embodiments, the TA and the UL initial data transmission power may be more accurately estimated based on the UL measurement at the pre-configured target gNB, and the network may in real time notify the UE by the target cell activation signaling the TA and the UL initial data transmission power associated with the final selected target beam.

Cell-radio network temporary identifier (C-RNTI), or other UE scrambling codes, may be maintained for the target cell or pre-configured for HO. Maintaining the C-RNTI (or other UE scrambling codes) is ideal. If the C-RNTI (or other UE scrambling codes) cannot be maintained, as long as the C_RNTI (if different) can be pre-assigned to the UE before handover to the target cell, the disclosed technique may still apply. With RACH-less mobility, the C-RNTI type of UE specific codes does not need to be updated through the RACH-based random access procedure.

In short, in phase 2, a complete set of parameters associated with each beam, such as the parameters shown in Table 2, for RACH-less access are pre-determined and stored at the network database. Such beam associated data allows the network to maintain all the parameters associated with the beams of interest globally for RACH-less mobility access. Only the parameters of the mobility target beams (e.g., a subset of the global lookup table) may need to be sent to the UE during the pre-configuration phase. RACH-less mobility may be realized with the network estimated best parameters sent to the UE via signaling such as an RRC message. By skipping the RACH-based random access procedure, the overall signaling overhead is also reduced.

In the third phase, the UE receives information about the network provided pre-determined TAs, UL initial data transmission power, and UL resource grant via a beam information message such as the RRC configuration message with sync in NR (i.e., a HO command) sent by the network in the second phase. The beam information message may include a list of the candidate cells/beams IDs of the TRPs/beams of the HO target cell(s) or cells/TRPs/beams on the predetermined route of the UE. The beam information message may further include, for each beam, the associated default TA, the UL initial data transmission power configuration, grant-free (GF) UL initial data transmission resource grant associated configuration parameters comprising a modulation coding scheme (MCS) type (e.g., MCS table ID), and the CP configuration (e.g., whether the normal CP (NCP) or the extended CP (ECP) is used). Upon receiving a command for HO or pre-configured SN activation, the UE selects a target beam for access. The UE then performs GF data transmission over the pre-granted dedicated UL resource with a default TA associated with the target beam, the pre-configured initial transmission power, the NCP or ECP per beam associated configuration, and the MCS scheme determined based on the MCS type (table) ID and MCS index. The network (i.e., the target base station) can determine the UE selected target beam based on the decoding of the target beam associated dedicated grant resource.

For RACH-less HO, there are scenarios where deterministic target beam associated TA(s) can be pre-determined. Drive tests may be needed to pre-determine the UE location dependent TA and other parameters for RACH-less HO. The network may have different implementations to either directly map the TA(s) to the target beam, or map the TA(s) to geo-location(s) and then associate with the target beam.

In one scenario, the beam sweeping is in the azimuth angle and the elevation angle. A default TA can be used for a small enough beam's coverage area. As FIG. 3B shows, each beam is associated with a TA. For example, a beam of the gNB 310 covering the coverage area 312 is associated with $TA_2$. The inaccuracy of a TA associated with a small beam is within the CP.

In another scenario, the beam sweeping is only in azimuth angle, resulting in long beam coverage, such as beam coverage areas 322, 324, and 326 of gNB 320 in FIG. 3C. The long beam coverage of a particular beam can be divided into different tiers of the coverage. The outer tier is of concern for mobility because only the TAs (such as $TA_{11}$, $TA_{21}$, and $TA_{31}$) at the borders is used for HO. As long as the default TA of the outer tier of a beam can be determined, the default TA can be associated with the beam for beam based mobility. In some embodiments, the network may collect the TAs used right after successful HOs over the time to get the default TA associated with the target beam for mobility.

Figure 3D:
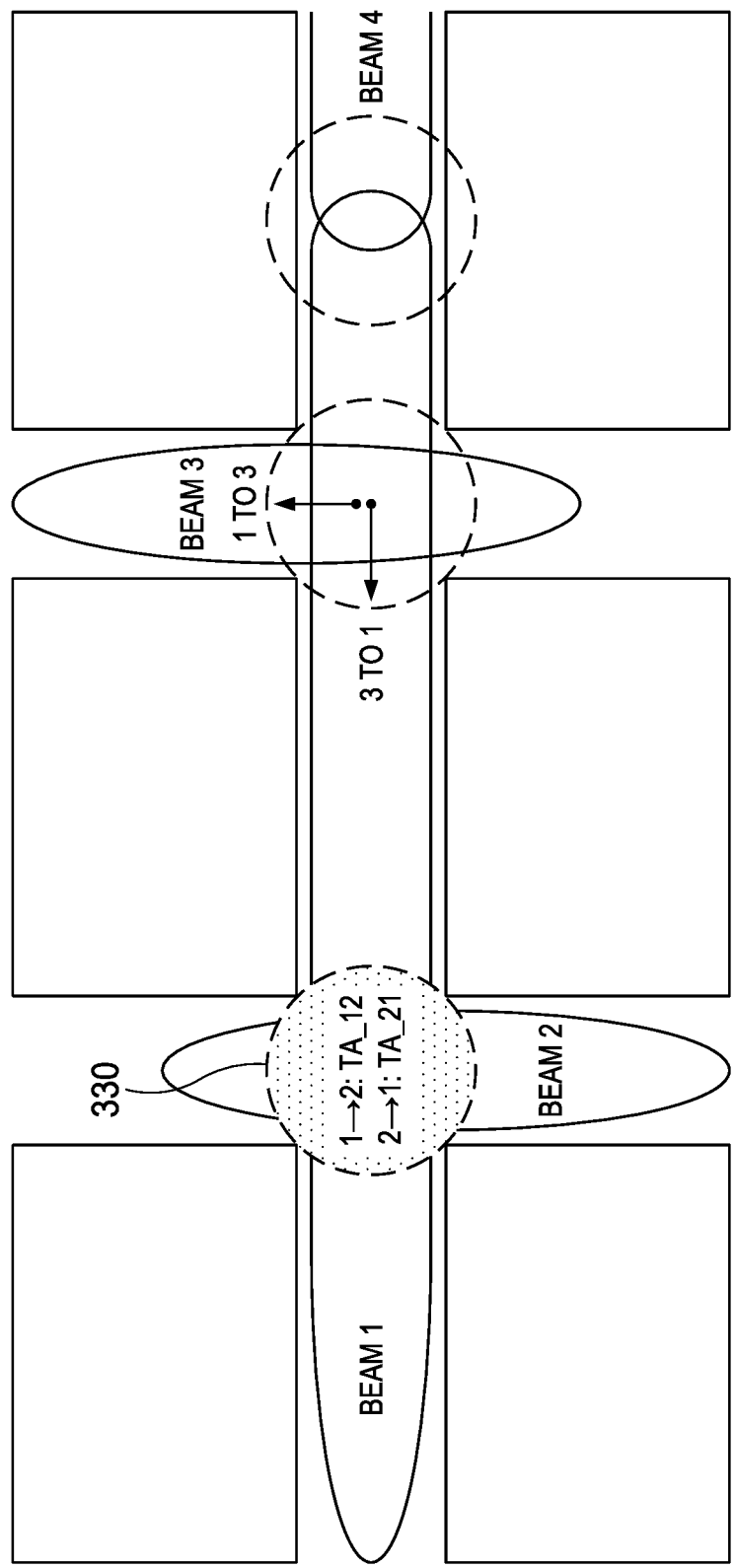
FIG. 3D shows an example of HO at the beam crossing in an urban environment.

In yet a third scenario in the urban, HO occurs at the beam coverage crossing where DC may be enabled first. There could be more than one TA associated with a target beam. But one default TA can be further identified by the source beam and the target beam together. For example, in FIG. 3D, if the UE is in the intersection area 330 and moves from Beam 2 coverage area to Beam 1 coverage area, TA_21 may be identified. If the UE is in the intersection area 320 and moves from Beam 1 coverage area to Beam 2 coverage area, TA_12 may be identified.

In the third scenario, a default TA at the crossing coverage of the target beam and the source beam may be determined at the network via Minimum Drive Test (MDT) for successful HOs. During the HO (including PSCell activation), the target cell may provide the target beams with associated TAs to the source cell, if more than one TA is associated with a target beam, the source cell may identify the one default TA based on the actual source beam. If the source cell still cannot determine the current source beam, multiple TAs can be sent to the UE, and the UE makes the final pick of the TA based on the current source and target beam at the moment of access.

FIG. 3E shows a Table 340 that helps identify a predetermined default TA based on the source beam and the target beam. For example, if the UE is located at the crossing of Beam4 of the source gNB and Beam5 of the target gNB, TA_45 might be identified.

In the Table 330, each cell carries a predetermined default TA value corresponding to the crossing of a source beam and a target beam. The empty cells are not applicable (e.g., two beams have no crossing). Obtaining the initial beam associated TA values can be performed via the drive test at the deployment phase. An initial drive test is a practice of deployment for radio configuration tuning and data collecting. A TA assigned to the UE can be collected during drive test. More focused drive tests can be conducted at the border areas: after a HO is successfully completed, all the HO access data should be collected including the TA(s), the initial successful transmission power, beam ID(SSB_ID or CSI-RS ID), Time of Stay (ToS) with the beam, etc. In so doing, TAs for HO associated with a beam can be obtained even for beams only conducting horizontal sweeping.

Optimized default TA values associated with beams covering specific spots can be adaptively obtained by the network's self-learning over the time. For each beam's coverage area, the network (i.e., base stations) collects the TAs applied to the UEs separately after successful HOs. The network may obtain the remaining timing offset of the received signals with the local timing reference after the most recent TA is determined by access preamble or UL reference signals and applied. To determine a new TA to minimize the average remaining timing offset, the new TA can be a long term average of the real TAs applied to individual UEs in the beam coverage. The change of long term filtered TA and the change of long term filtered remaining timing offset can be used as the guidance for determine the next update of the default TA for a small coverage area of a beam. The TA sampling values for the network to learn are from many different UEs passed through the beam coverage area over a long time period.

Figure 4:
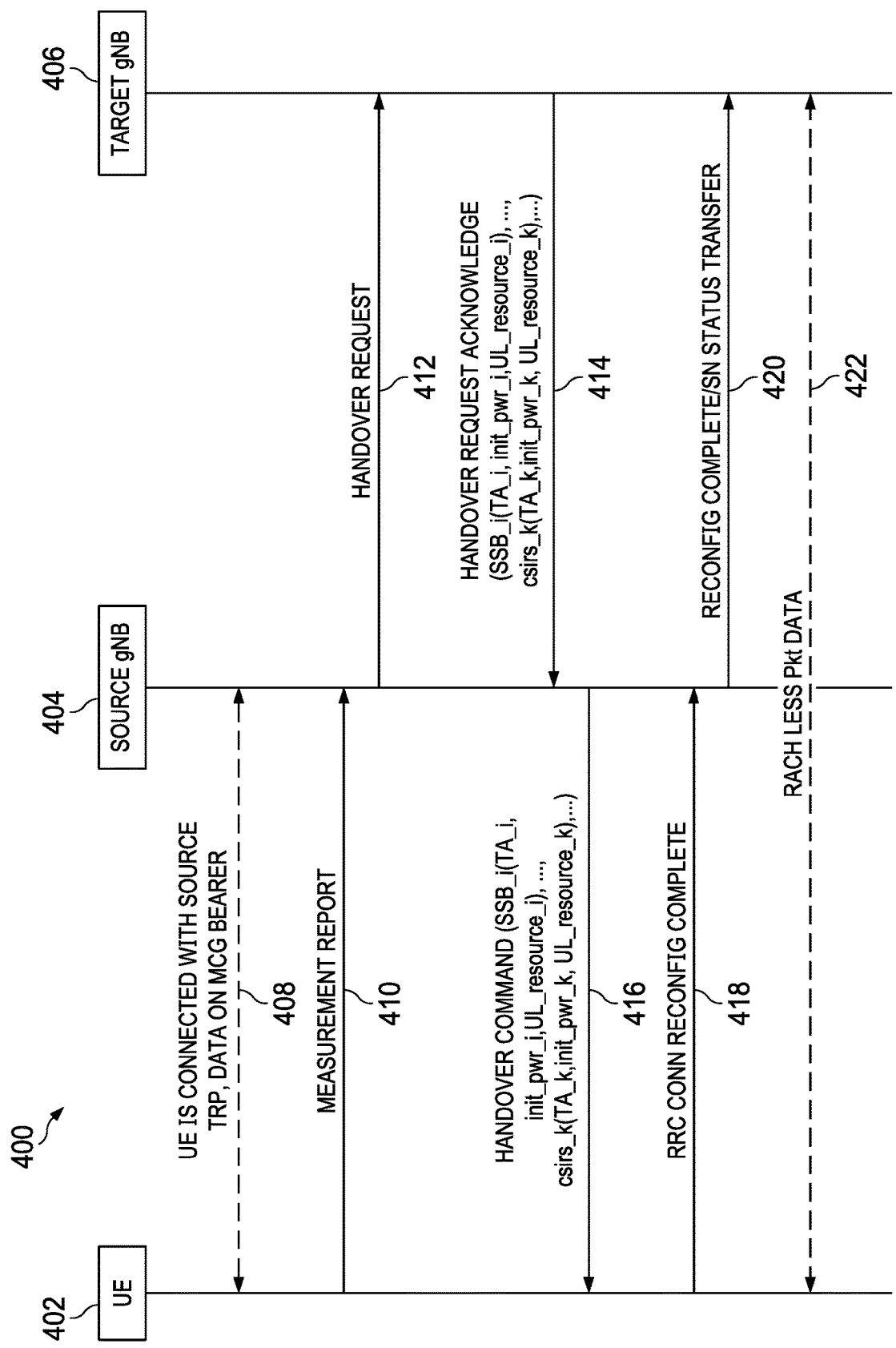
FIG. 4 illustrates an embodiment message flow for RACH-less mobility from a source gNB to a target gNB.

FIG. 4 illustrates a message flow 400 for RACH-less basic handover from a source gNB 404 to a target gNB 406, according to one embodiment. At operation 408, the UE 402 is connected with the source gNB 404, and data is transmitted over the master cell group (MCG) bearer between the UE 402 and the source gNB 404. At operation 410, the UE 402 transmits a measurement report to the source gNB 404. Based on the measurement report, at operation 412, the source gNB 404 transmits a handover request to the target gNB 406. In response, at operation 414, the target gNB 406 transmits the handover request acknowledgement to the source gNB 404. The handover request acknowledgement may include the beam associated information. The beam associated information may indicate, for each of the beams of the target gNB 406 that the UE 402 may migrate to, a beam ID, a default TA, a UL initial data transmission power configuration, a GF UL initial data transmission resource grant associated configuration parameters for GF UL message/short data transmission to the target gNB 406, and a resource grant for the UE sending the RRC reconfiguration complete message to the source gNB 404.

The beam ID may be an SSB ID, such as SSB_i, in FIG. 4. The beam ID may also be a channel state information (CSI)-reference signal (RS) ID, such as csirs_k in FIG. 4. The beam associated information may also indicate a CP configuration (e.g., NCP or ECP). NCP can be applied if the network confidence level is high for the default TA associated with the beam; otherwise, ECP can be used for the beam.

Next, at operation 416, the source gNB 404 relays the beam associated information in a handover command to the UE 402. The handover command may be sent in an RRC message. At operation 418, the UE 402 transmits an RRC connection reconfiguration complete message to the source gNB 404. Alternatively, at operation 418, the UE 402 may send a GF transmission to the source gNB 404.

At operation 420, the source gNB 404 transmits the RRC connection reconfiguration complete message to the target gNB 406. The source gNB 404 may transmit the sequence number (SN) status transfer message to the target gNB 406 at operation 420. At operation 422, RACH-less data communications between the UE 402 and the target gNB 406 may be established. For example, the UE 402 may transmit, without random access, GF UL data to the target gNB 406 based on a target beam of the target gNB 406 in which the UE is located and the beam associated information received at operation 416. The data transmission at operation 422 may be GF data transmission during or after the handover at the beginning.

Figure 5:
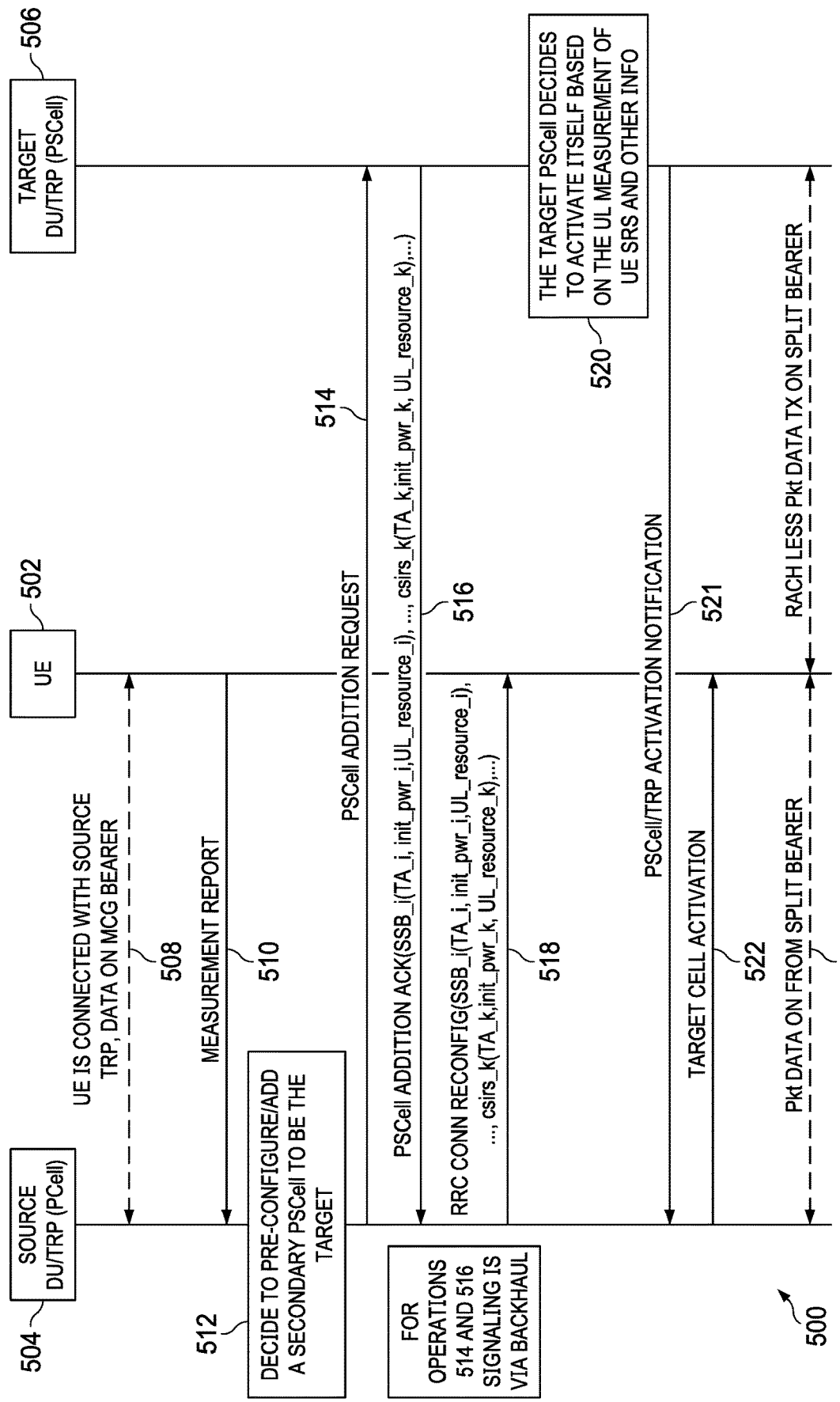
FIG. 5 illustrates an embodiment message flow for adding a secondary node (e.g., a secondary cell or TRP) to support RACH-less access.

FIG. 5 illustrates a message flow 500 for adding a secondary node (e.g., a secondary cell or TRP) to support RACH-less access, according to one embodiment. The impact of message flow 500 is the same as the impact of message flow 400. At operation 508, the UE 502 is connected with the source DU 504 which is the node of the PCell, and data is transmitted over the MCG bearer between the UE 502 and the source DU 504. At operation 510, the UE 502 transmits a measurement report to the source DU 504. Based on the measurement report, at operation 512, the source DU determines to pre-configure or add a secondary PSCell/TRP to be the target cell. At operation 514, the source DU transmits a PSCell addition request to the target DU 506 via the backhaul. At operation 516, the target DU 506 transmits a PSCell addition acknowledgement to the source DU 504 via the backhaul. The PSCell addition acknowledgement may include the beam associated information. The beam associated information indicates, for each of the beams of the target DU 506 that the UE 502 may migrate to, a beam ID, a predetermined default TA, a predetermined UL initial data transmission power configuration for RACH-less data transmission, NCP or ECP per beam associated configuration, a GF UL initial data transmission resource grant associated configuration parameters for the UE GF UL message/short data transmission to the target DU 506, the MCS scheme determined based on the MCS type (table) ID and MCS index.

The beam ID may be an SSB ID, such as SSB_i, in FIG. 5. The beam ID may also be a channel state information (CSI)-reference signal (RS) ID, such as csirs_k in FIG. 5. The beam associated information may also indicate a CP configuration (e.g., NCP or ECP). NCP can be applied if the network confidence level is high for the default TA associated with the beam; otherwise, ECP can be used for the beam.

At operation 518, the source DU 504 relays the beam associated information in an RRC connection reconfiguration message to the UE 502. At operation 520, the target DU 506 determines to activate itself based on the UL measurement of the UE SRS and other information. At operation 521, the target DU 506 may transmit a target PSCell activation notification to the source DU 504. At operation 522, the source DU 504 transmits a target PSCell activation message to the UE 502. Alternatively, signaling for PSCell activation can be GF transmission in the source DU 502. The signaling may be downlink control information (DCI) or MAC control element (MAC CE) signaling.

At operation 524, RACH-less data communications between the UE 502 and the source DU 504, and between the UE 502 and the target DU 506 may be established over the split bearer. For operation 524, the initial bear data transmission can perform GF data transmission(s) in any of the split bearers or the two split bearers. The initial GF data transmission can contain additional DMRS symbols for further TA measurement and adjustment.

Figure 6:
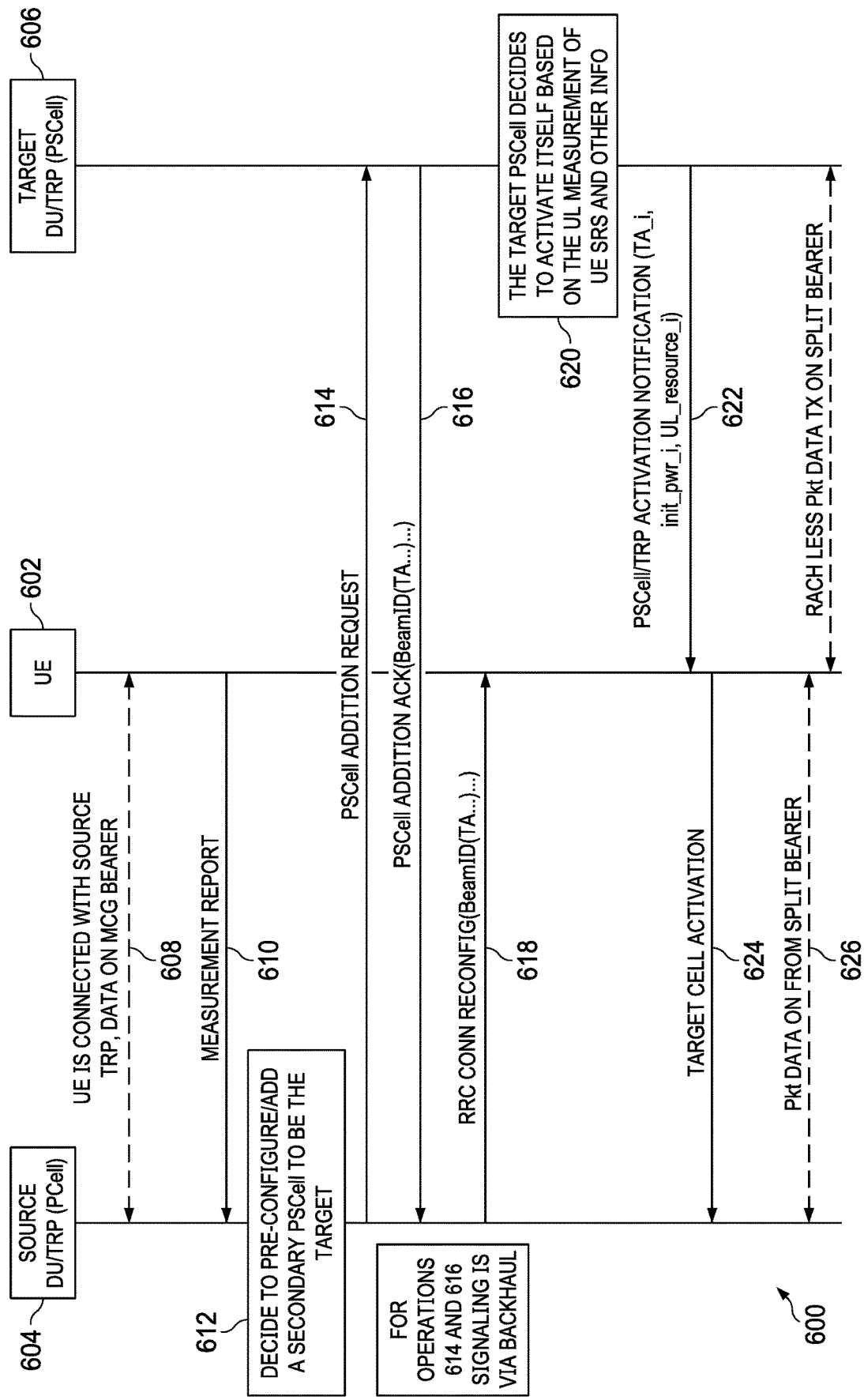
FIG. 6 illustrates an embodiment message flow for in dual connectivity (DC) based handover with UL measurement based activation to support RACH-less access.

FIG. 6 illustrates a message flow 600 for in dual connectivity (DC) based handover with UL measurement based activation to support RACH-less access, according to one embodiment. At operation 608, the UE 602 is connected with the source DU 604, and data is transmitted over the MCG bearer between the UE 602 and the source DU 604. At operation 610, the UE 602 transmits a measurement report to the source DU 604. Based on the measurement report and other side information from the network for mobility prediction, at operation 612, the source DU determines to pre-configure or add a secondary PSCell/TRP to be the target. At operation 614, the source DU transmits a PSCell addition request to the target DU 606 via the backhaul. At operation 616, the target DU 606 transmits a PSCell addition acknowledgement message to the source DU 604 via the backhaul. The PSCell addition acknowledgement message may include beam associated information. The beam associated information indicates, for each of the beams of the target DU 606 that the UE 602 may migrate to, a beam ID, a default TA, a UL initial data transmission power configuration, a GF UL initial data transmission resource grant associated configuration parameters for GF UL message/short data transmission to the target DU 606, and a resource grant for the UE forwarding the target PSCell activation notification to the source gNB 604.

At operation 618, the source DU 604 relays the beam associated information in an RRC connection reconfiguration message to the UE 602. At operation 620, the target DU 606 determines to activate itself based on the measurement of the UE transmitted UL reference signals such as SRS and other information.

At operation 622, the target DU 604 transmits to the UE 602 a PSCell activation message possibly including the information about TAs, UL initial data transmission power configurations, and UL initial data transmission resource grant associated configuration parameters. At operation 624, the UE 602 transmits a target cell activation notification message to the source base station 604 on the pre-configured resource grant which was delivered to the UE via the RRC reconfiguration message for target PSCell addition.

At operation 626, RACH-less data communications between the UE 602 and the source DU 604, and between the UE 602 and the target DU 606 may be established over the split bearer. For operation 626, the initial bear data transmission can perform GF data transmission(s) in any of the split bearers or the two split bearers. The initial GF data transmission can contain additional DMRS symbols for further TA measurement and adjustment.

There are two options for the flow in FIG. 6. In the first option, the TAs, the initial UL transmission power, and UL transmission resources associated with the candidate target beams can be delivered to the UE via messages in operations 616 and 618.

In the second option, after the secondary node or site is pre-configured, the secondary node decides the DC activation based on the UL measurement. In this case, the secondary node can determine the precise TA of the UE at the UE's current location based on the UL measurement report.

The secondary node can also determine more suitable initial UL data transmission power based on the UL measurement report.

The secondary node sends signaling (such as MAC CE or other means) to the UE to activate the DC, which can carry the TA, the initial transmission power, and the grants for DL and/or UL data transmissions. The RRC connection reconfiguration message in operation 618 can also carry the pre-allocated resource grant for the message in operation 624. The UL_resource_i in operation 622 can include the configured grant resource configurations for GF UE transmission in the target gNB. The activation notification in operation 622 can be via the DCI or MAC CE signaling. The message for operation 624 can alternatively be GF transmission in the source gNB.

After the UE is configured for the UL RACH-less transmission and a target beam is selected for access, the UE performs GF data transmission over the pre-granted dedicated UL resource, with the default TA associated with the target beam, the pre-configured initial transmission power, the NCP or ECP per beam associated configuration, and the MCS scheme determined based on the MCS type (table) ID and the MCS index.

The default TA may be only used for the initial RACH-less data transmission. The initial transmission data block contains additional DMRS symbols for further TA measurement and adjustment at the receiving gNB. The network based on the received DMRS of the initial GF data block to measure the remaining timing offset and send the more accurate TA to the UE if needed. The network/gNB can determine the UE selected target beam based on the decoding of the beam associated dedicated grant resources.

The technique as shown in flow 600 of FIG. 6 reduces the delay (i.e., an improvement for URLLC) and signaling overhead by reducing the signaling steps. The technique also reduces the DL/UL channel set up time and allows initial GF data transmission.

Figure 7:
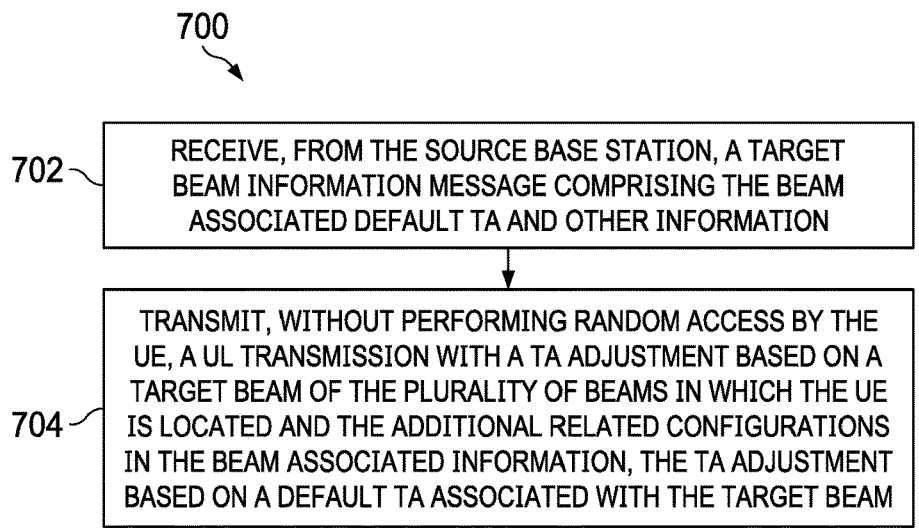
FIG. 7 illustrates a flowchart of a method performed by a UE for RACH-less mobility from a source base station to a target base station, according to some embodiments.

FIG. 7 illustrates a flowchart of a method 700 performed by a UE for RACH-less mobility from a source base station to a target base station, according to some embodiments. The method 700 may be carried out or performed by hardware of a UE, such as the UE 120 in FIG. 1. The method 700 may also be carried out or performed by routines, subroutines, or modules of software executed by one or more processors of the UE. The method 700 may further be carried out or performed by a combination of hardware and software. Coding of the software for carrying out or performing the method 700 is well within the scope of a person of ordinary skill in the art having regard to the present disclosure. The method 700 may include additional or fewer operations than those shown and described and may be carried out or performed in a different order. Computer-readable code or instructions of the software executable by the one or more processor of the UE may be stored on a non-transitory computer-readable medium, such as for example, memory of the UE.

Method 700 starts at operation 702, where a UE may receive, from the source base station, a beam information message comprising beam associated information. The beam associated information may indicate a plurality of beam identifiers (IDs) corresponding to a plurality of beams in the target base station and a plurality of default timing advance (TA)s. Each default TA of the plurality of TAs may be associated with one beam of the plurality of beams in the target base station and additional related configurations.

The beam information message may be transmitted based on RRC signaling or layer one (L1) signaling. The beam information message may comprise one of an RRC connection reconfiguration message configured as a handover (HO) command, or a PSCell activation message.

The additional related configurations associated with the one beam of the plurality of beams may comprise a cyclic prefix (CP) configuration, a UL transmission power configuration, a time-frequency UL transmission resource configuration, one or more demodulation reference signal (DMRS) configurations, and one or more MCS configurations. A beam ID of the plurality of beam IDs may be one of a SSB ID, or channel state information (CSI)-reference signal (RS) ID.

At operation 704, the UE may transmit, to the target base station without performing random access by the UE, a UL transmission with a TA adjustment based on a target beam of the plurality of beams in which the UE is located and the additional related configurations in the beam associated information. The TA adjustment may be based on a default TA associated with the target beam.

Before the UE transmits the UL transmission at operation 704, the UE may select the target beam from one or more candidate beams for access. The UE then may determine a default TA for RACH-less access in the target beam based on a beam ID associated with the target beam and the beam associated information in the beam information message.

Figure 8:
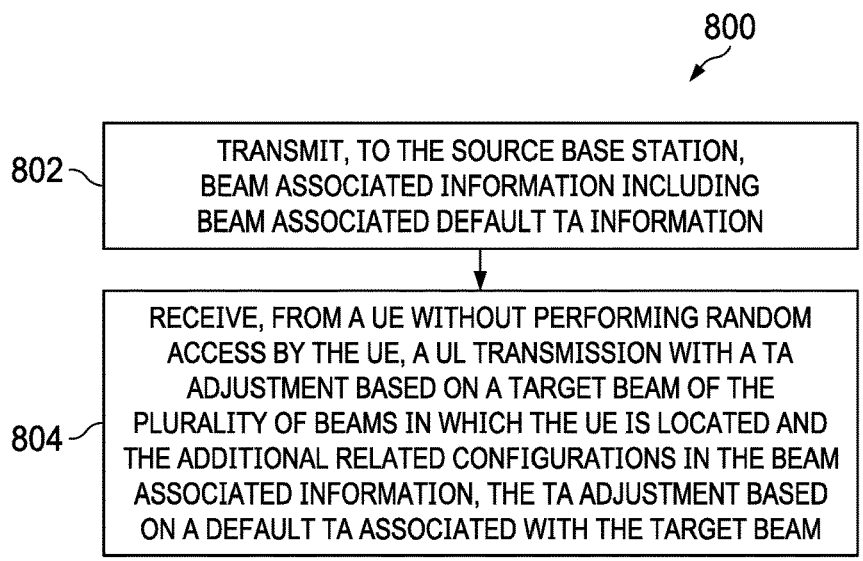
FIG. 8 illustrates a flowchart of a method performed by a target base station for RACH-less mobility from a source base station to the target base station, according to some embodiments.

FIG. 8 illustrates a flowchart of a method 800 performed by a target base station for RACH-less mobility from a source base station to the target base station, according to some embodiments. The method 800 may be carried out or performed by hardware of a base station, such as the base station 110 in FIG. 1. The method 800 may also be carried out or performed by routines, subroutines, or modules of software executed by one or more processors of the base station. The method 800 may further be carried out or performed by a combination of hardware and software. Coding of the software for carrying out or performing the method 800 is well within the scope of a person of ordinary skill in the art having regard to the present disclosure. The method 800 may include additional or fewer operations than those shown and described and may be carried out or performed in a different order. Computer-readable code or instructions of the software executable by the one or more processor of the base station may be stored on a non-transitory computer-readable medium, such as for example, memory of the base station.

Method 800 starts at operation 802, where the target base station may transmit, to the source base station, beam associated information. The beam associated information may indicate a plurality of beam identifiers (IDs) corresponding to a plurality of beams in the target base station and a plurality of default timing advance (TA)s. Each default TA of the plurality of TAs may be associated with one beam of the plurality of beams in the target base station and additional related configurations.

The target base station may transmit the beam information message in one of a handover (HO) request acknowledgement message or a PSCell addition acknowledgement message to the source base station.

The additional related configurations associated with the one beam of the plurality of beams may comprise a cyclic prefix (CP) configuration, a UL transmission power configuration, a time-frequency UL transmission resource configuration, one or more demodulation reference signal (DMRS) configurations, and one or more MCS configurations. A beam ID of the plurality of beam IDs may be one of a SSB ID, or channel state information (CSI)-reference signal (RS) ID.

At operation 804, the target base station may receive from a UE without performing random access by the UE, a UL transmission with a TA adjustment based on a target beam of the plurality of beams in which the UE is located and the additional related configurations in the beam associated information. The TA adjustment may be based on a default TA associated with the target beam.

Before the target base station receives the UL transmission at operation 804, the UE may select the target beam from one or more candidate beams for access. The UE may determine a default TA for RACH-less access in the target beam based on a beam ID associated with the target beam and the beam associated information in the beam information message.

Figure 9:
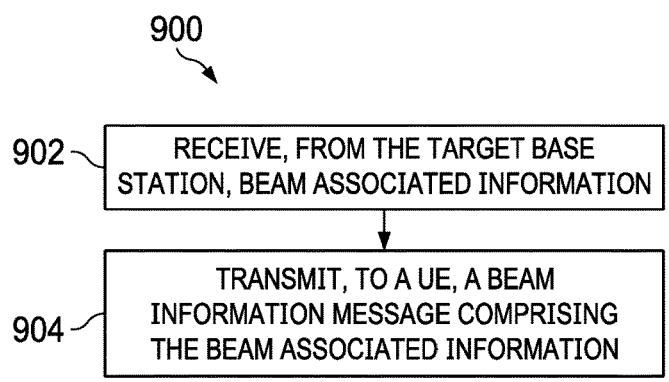
FIG. 9 illustrates a flowchart of a method performed by a source base station for RACH-less mobility from the source base station to a target base station, according to some embodiments.

FIG. 9 illustrates a flowchart of a method 900 performed by a source base station for RACH-less mobility from the source base station to a target base station, according to some embodiments. The method 900 may be carried out or performed by hardware of a base station, such as the base station 110 in FIG. 1. The method 900 may also be carried out or performed by routines, subroutines, or modules of software executed by one or more processors of the base station. The method 900 may further be carried out or performed by a combination of hardware and software. Coding of the software for carrying out or performing the method 900 is well within the scope of a person of ordinary skill in the art having regard to the present disclosure. The method 900 may include additional or fewer operations than those shown and described and may be carried out or performed in a different order. Computer-readable code or instructions of the software executable by the one or more processor of the base station may be stored on a non-transitory computer-readable medium, such as for example, memory of the base station.

Method 900 starts at operation 902, where the source base station may receive, from the target base station, beam associated information. The beam associated information may indicate a plurality of beam identifiers (IDs) corresponding to a plurality of beams in the target base station and a plurality of default timing advance (TA)s. Each default TA of the plurality of TAs may be associated with one beam of the plurality of beams in the target base station and additional related configurations.

The additional related configurations associated with the one beam of the plurality of beams may comprise a cyclic prefix (CP) configuration, a UL transmission power configuration, a time-frequency UL transmission resource configuration, one or more demodulation reference signal (DMRS) configurations, and one or more MCS configurations. A beam ID of the plurality of beam IDs may be one of a SSB ID, or channel state information (CSI)-reference signal (RS) ID.

At operation 904, the source base station may transmit, to a UE, a beam information message comprising beam associated information. The UE may transmit, to the target base station without performing random access by the UE, a UL transmission with a TA adjustment based on a target beam of the plurality of beams in which the UE is located and the additional related configurations in the beam associated information. The TA adjustment may be based on a default TA associated with the target beam.

Before the UE transmits the UL transmission, the UE may select the target beam from one or more candidate beams for access. The UE then may determine a default TA for RACH-less access in the target beam based on a beam ID associated with the target beam and the beam associated information in the beam information message.

The beam information message may be transmitted based on RRC signaling or layer one (L1) signaling. The beam information message may comprise one of an RRC connection reconfiguration message configured as a handover (HO) command, or a PSCell activation message.

To summarize, in some embodiments, to support RACH-less mobility, the network may provide to a UE the predetermined TA, the transmission power configuration, the UL resource grant in a beam information message via RRC signaling (e.g., a HO command) or layer one (L1) signaling. The beam information message may contain a list of the candidate cells/beams IDs of the cells/TRPs/beams of the HO target cell(s) or cells on the predetermined route of the UE. The beam information message may contain, for each beam of the candidate beams, the associated default TA, the associated UL resource grant for the RACH-less initial GF data transmission which includes the MCS type (MCS table ID), the transmission power configuration, and whether NCP or ECP is used.

After the UE is configured for UL RACH-less transmission and a target beam is selected for access, the UE may perform the data transmission over the pre-granted dedicated UL resource, with the default TA associated with the target beam, the pre-configured initial transmission power, the NCP or ECP per beam associated configuration, and the MCS scheme determined based on the MCS type (table) ID and the MCS index. The initial transmission data block may contain additional DMRS symbols for further TA measurement and adjustment at the receiving gNB.

The initial beam associated default TA values can be obtained via the drive test at the deployment phase. The default TA value associated with a beam can be adaptively optimized over the time based on the actual offset of the received signals of the UE at the UL receivers. The UL initial data transmission power at the target cell can be pre-configured to the UE. The real time TA can be obtained by cross listening configured at the target cell. The TA and the UL initial transmission power can be more accurately estimated based on the UL measurement and real time notify the UE via signaling.

The described technical solution in this disclosure provides a generic technique for RACH-less mobility. The described technique can be used for different standards as long as the same or similar mechanism is developed. This disclosure can support RACH-less access not only for a UE in the RRC connected mode, but also RACH-less resume and/or direct data transmission for UEs in the inactive mode.

Figure 10A:
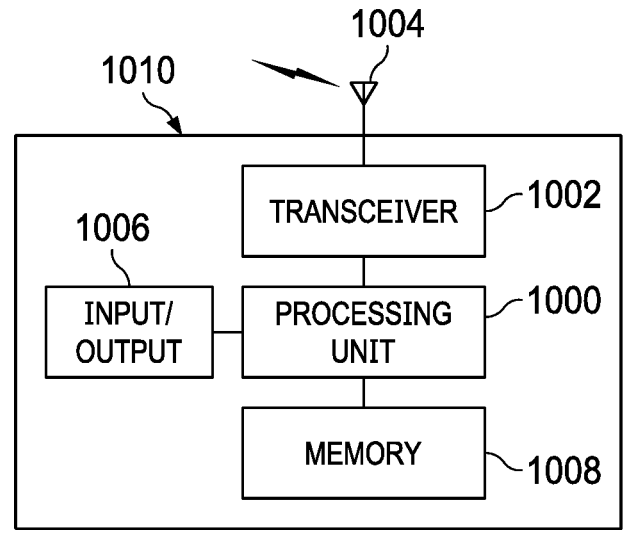
FIG. 10A illustrates an example UE, according to some embodiments.
Figure 10B:
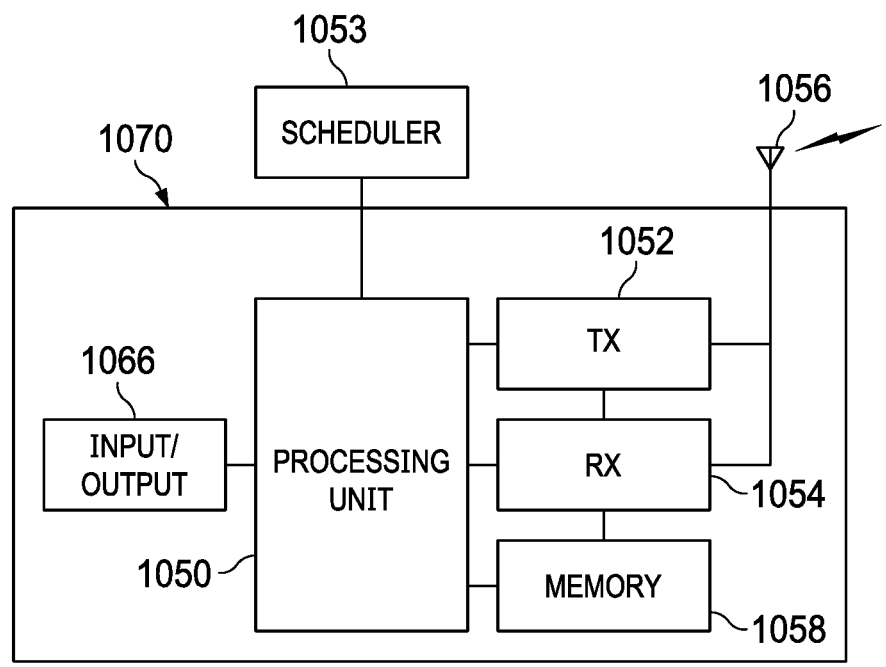
FIG. 10B illustrates an example base station, according to some embodiments.

FIGS. 10A and 10B illustrate example devices that may implement the methods and teachings according to this disclosure, such as methods 700, 800, and 900. In particular, FIG. 10A illustrates an example UE 1010, and FIG. 10B illustrates an example base station 1070.

As shown in FIG. 10A, the UE 2310 includes at least one processing unit 1000. The processing unit 1000 implements various processing operations of the UE 1010. For example, the processing unit 1000 could perform signal coding, data processing, power control, input/output processing, or any other functionality enabling the UE 1010 to operate in the network. The processing unit 1000 may also be configured to implement some or all of the functionality and/or embodiments described in more detail above. Each processing unit 1000 includes any suitable processing or computing device configured to perform one or more operations. Each processing unit 1000 could, for example, include a microprocessor, microcontroller, digital signal processor, field programmable gate array, or application specific integrated circuit.

The UE 1010 also includes at least one transceiver 1002. The transceiver 1002 is configured to modulate data or other content for transmission by at least one antenna or Network Interface Controller (NIC) 1004. The transceiver 1002 is also configured to demodulate data or other content received by the at least one antenna 1004. Each transceiver 1002 includes any suitable structure for generating signals for wireless transmission and/or processing signals received. Each antenna 1004 includes any suitable structure for transmitting and/or receiving wireless signals. One or multiple transceivers 1002 could be used in the UE 1010, and one or multiple antennas 1004 could be used in the UE 1010. Although shown as a single functional unit, a transceiver 1002 could also be implemented using at least one transmitter and at least one separate receiver.

The UE 1010 further includes one or more input/output devices 1006 or interfaces. The input/output devices 1006 permit interaction with a user or other devices in the network. Each input/output device 1006 includes any suitable structure for providing information to or receiving information from a user, such as a speaker, microphone, keypad, keyboard, display, or touch screen, including network interface communications.

In addition, the UE 1010 includes at least one memory 1008. The memory 1008 stores instructions and data used, generated, or collected by the UE 1010. For example, the memory 1008 could store software instructions or modules configured to implement some or all of the functionality and/or embodiments described above and that are executed by the processing unit(s) 1000. Each memory 1008 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. It is understood that the components as shown in FIG. 10A is for the purpose of illustration and the UE 1010 may include part or all of the components illustrated in FIG. 10A.

As shown in FIG. 10B, the base station 1070 includes at least one processing unit 1050, at least one transmitter 1052, at least one receiver 1054, one or more antennas 1056, at least one memory 1058, and one or more input/output devices or interfaces 1066. A transceiver, not shown, may be used instead of the transmitter 1052 and receiver 1054. A scheduler 1053 may be coupled to the processing unit 1050. The scheduler 1053 may be included within or operated separately from the base station 1070. The processing unit 1050 implements various processing operations of the base station 1070, such as signal coding, data processing, power control, input/output processing, or any other functionality. The processing unit 1050 can also be configured to implement some or all of the functionality and/or embodiments described in more detail above. Each processing unit 1050 includes any suitable processing or computing device configured to perform one or more operations. Each processing unit 1050 could, for example, include a microprocessor, microcontroller, digital signal processor, field programmable gate array, or application specific integrated circuit. It is understood that the components as shown in FIG. 10B is for the purpose of illustration and the base station 1070 may include part or all of the components illustrated in FIG. 10B.

Each transmitter 1052 includes any suitable structure for generating signals for wireless transmission to one or more UEs or other devices. Each receiver 1054 includes any suitable structure for processing signals received from one or more UEs or other devices. Although shown as separate components, at least one transmitter 1052 and at least one receiver 1054 could be combined into a transceiver. Each antenna 1056 includes any suitable structure for transmitting and/or receiving wireless or wired signals. Although a common antenna 1056 is shown here as being coupled to both the transmitter 1052 and the receiver 1054, one or more antennas 1056 could be coupled to the transmitter(s) 1052, and one or more separate antennas 1056 could be coupled to the receiver(s) 1054. Each memory 1058 includes any suitable volatile and/or non-volatile storage and retrieval device(s) such as those described above in connection to the UE 1010. The memory 1058 stores instructions and data used, generated, or collected by the base station 1070. For example, the memory 1058 could store software instructions or modules configured to implement some or all of the functionality and/or embodiments described above and that are executed by the processing unit(s) 1050.

Each input/output device 1066 permits interaction with a user or other devices in the network. Each input/output device 1066 includes any suitable structure for providing information to or receiving/providing information from a user, including network interface communications.

Figure 11:
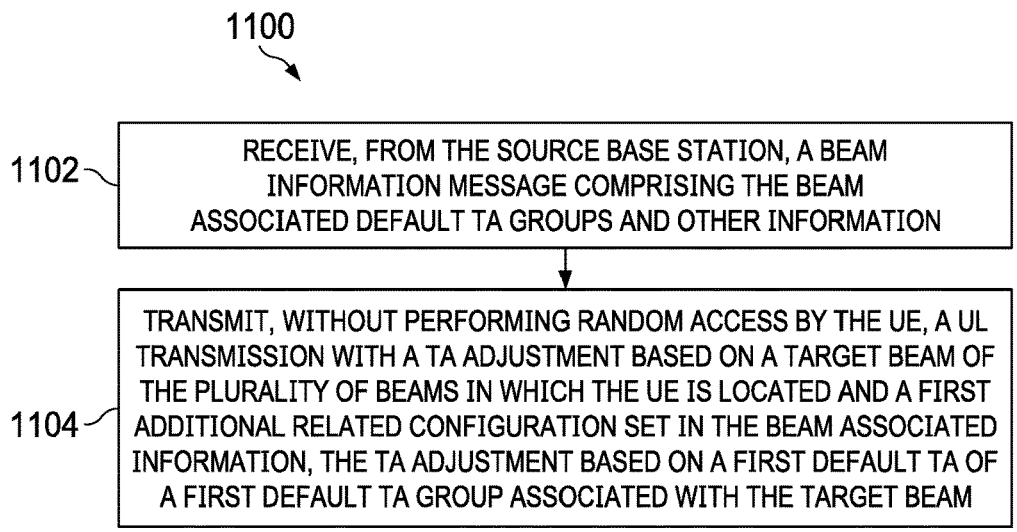
FIG. 11 illustrates a flowchart of a method performed by a UE for RACH-less mobility from a source base station to a target base station, according to some embodiments.

FIG. 11 illustrates a flowchart of a method 1100 performed by a UE for RACH-less mobility from a source base station to a target base station, according to some embodiments. The method 1100 may be carried out or performed by hardware of a UE, such as the UE 120 in FIG. 1. The method 1100 may also be carried out or performed by routines, subroutines, or modules of software executed by one or more processors of the UE. The method 1100 may further be carried out or performed by a combination of hardware and software. Coding of the software for carrying out or performing the method 1100 is well within the scope of a person of ordinary skill in the art having regard to the present disclosure. The method 1100 may include additional or fewer operations than those shown and described and may be carried out or performed in a different order. Computer-readable code or instructions of the software executable by the one or more processor of the UE may be stored on a non-transitory computer-readable medium, such as for example, memory of the UE.

Method 1100 starts at operation 1102, where a UE receives, from the source base station, a beam information message comprising beam associated information. The beam associated information indicates a plurality of beam identifiers (IDs) corresponding to a plurality of beams in the target base station, a plurality of default timing advance (TA) groups, and a plurality of additional related configuration sets. Each default TA group of the plurality of default TA groups is associated with a beam of the plurality of beams in the target base station and an additional related configuration set of the plurality of the additional related configuration sets.

At operation 1104, the UE transmits, to the target base station without performing random access by the UE to the target base station, an uplink (UL) transmission with a TA adjustment based on a target beam of the plurality of beams in which the UE is located and a first additional related configuration set of the plurality of additional related configuration sets. The TA adjustment is based on a first default TA of a first default TA group associated with the target beam, and the first additional related configuration set is associated with the first default TA.

In some embodiments, the first default TA group associated with the target beam comprises a set of default TAs. Each one of the set of the default TAs corresponds to a beam in the source base station. The UE determines the first default TA based on the target beam and a source beam in the source base station in which the UE is located. In some embodiments, the first default TA is the only TA in the first default TA group. In some embodiments, TAs in the plurality of default TA groups are obtained by the target base station by collecting previous TAs used in previous successful handovers.

In some embodiments, the UE may select the target beam from one or more candidate beams for access. The UE may determine the first default TA for RACH-less access in the target beam based on a beam ID associated with the target beam and the beam associated information in the beam information message.

In some embodiments, the beam information message is transmitted based on RRC signaling or layer one (L1) signaling. The beam information message may comprise one of an RRC connection reconfiguration message configured as a handover (HO) command, or a PSCell activation message. In some embodiments, a beam ID of the plurality of beam IDs may be one of a SSB ID, or a channel state information (CSI)-reference signal (RS) ID.

Figure 12:
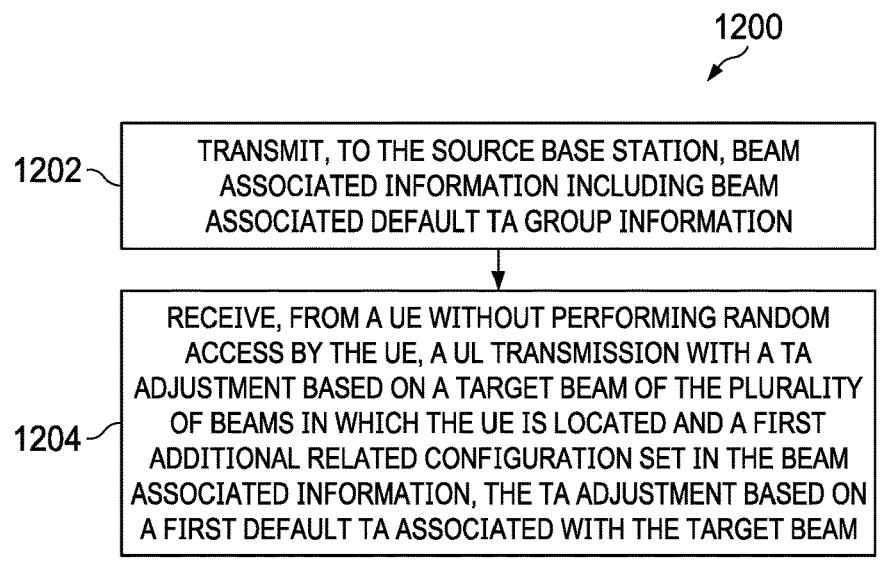
FIG. 12 illustrates a flowchart of a method performed by a target base station for RACH-less mobility from a source base station to the target base station, according to some embodiments.

FIG. 12 illustrates a flowchart of a method 1200 performed by a target base station for RACH-less mobility from a source base station to the target base station, according to some embodiments. The method 1200 may be carried out or performed by hardware of a base station, such as the base station 110 in FIG. 1. The method 1200 may also be carried out or performed by routines, subroutines, or modules of software executed by one or more processors of the base station. The method 1200 may further be carried out or performed by a combination of hardware and software. Coding of the software for carrying out or performing the method 1200 is well within the scope of a person of ordinary skill in the art having regard to the present disclosure. The method 1200 may include additional or fewer operations than those shown and described and may be carried out or performed in a different order. Computer-readable code or instructions of the software executable by the one or more processor of the base station may be stored on a non-transitory computer-readable medium, such as for example, memory of the base station.

Method 1200 starts at operation 1202, where the target base station transmits, to the source base station, beam associated information. The beam associated information indicates a plurality of beam identifiers (IDs) corresponding to a plurality of beams in the target base station, a plurality of default timing advance (TA) groups, and a plurality of additional related configuration sets. Each default TA group of the plurality of default TA groups is associated with a beam of the plurality of beams in the target base station and an additional related configuration set of the plurality of the additional related configuration sets.

At operation 1204, the target based station receives, from a user equipment (UE) without performing random access by the UE, an uplink (UL) transmission with a TA adjustment based on a target beam of the plurality of beams in which the UE is located and a first additional related configuration set of the plurality of additional related configuration sets. The TA adjustment is based on a first default TA of a first default TA group associated with the target beam. The first additional related configuration set is associated with the first default TA.

In some embodiments, the first default TA group associated with the target beam may comprise a set of default TAs. Each one of the set of the default TAs corresponds to a beam in the source base station. The first default TA is determined based on the target beam and a source beam in the source base station in which the UE is located and connected with the source base station.

In some embodiments, the first default TA is the only TA in the first default TA group. In some embodiments, TAs in the plurality of default TA groups are obtained by the target base station by collecting previous TAs used in previous successful handovers.

In some embodiments, the UE may select the target beam from one or more candidate beams for access and determine a default TA for RACH-less access in the target beam based on a beam ID associated with the target beam and the beam associated information in a beam information message transmitted from the source base station to the UE.

In some embodiments, a beam information message may be transmitted from the source base station to the UE in one of a handover (HO) request acknowledgement message or a PSCell addition acknowledgement message to the source base station.

In some embodiments, the first additional related configuration set may comprise at least one of a cyclic prefix (CP) configuration, a UL transmission power configuration, a time-frequency UL transmission resource configuration, one or more demodulation reference signal (DMRS) configurations, or one or more modulation coding scheme (MCS) configurations.

In some embodiments, a beam ID of the plurality of beam IDs may be one of a SSB ID, or a channel state information (CSI)-reference signal (RS) ID.

Figure 13:
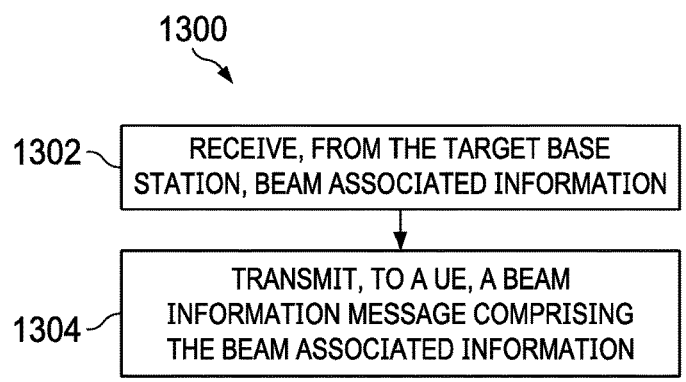
FIG. 13 illustrates a flowchart of a method performed by a source base station for RACH-less mobility from the source base station to a target base station, according to some embodiments.

FIG. 13 illustrates a flowchart of a method 1300 performed by a source base station for RACH-less mobility from the source base station to a target base station, according to some embodiments. The method 1300 may be carried out or performed by hardware of a base station, such as the base station 110 in FIG. 1. The method 1300 may also be carried out or performed by routines, subroutines, or modules of software executed by one or more processors of the base station. The method 1300 may further be carried out or performed by a combination of hardware and software. Coding of the software for carrying out or performing the method 1300 is well within the scope of a person of ordinary skill in the art having regard to the present disclosure. The method 1300 may include additional or fewer operations than those shown and described and may be carried out or performed in a different order. Computer-readable code or instructions of the software executable by the one or more processor of the base station may be stored on a non-transitory computer-readable medium, such as for example, memory of the base station.

Method 1300 starts at operation 1302, where the source base station receives, from the target base station, beam associated information. The beam associated information indicates a plurality of beam identifiers (IDs) corresponding to a plurality of beams in the target base station, a plurality of default timing advance (TA) groups, and a plurality of additional related configuration sets. Each default TA group of the plurality of default TA groups is associated with a beam of the plurality of beams in the target base station and an additional related configuration set of the plurality of the additional related configuration sets.

At operation 1304, the source base station transmits, to a user equipment (UE), a beam information message comprising the beam associated information. The UE, without performing random access, transmits to the target base station, an uplink (UL) transmission with a TA adjustment based on a target beam of the plurality of beams in which the UE is located and a first additional related configuration set of the plurality of additional related configuration sets. The TA adjustment is based on a first default TA of a first default TA group associated with the target beam. The first additional related configuration set is associated with the first default TA.

In some embodiments, the first default TA group associated with the target beam may comprise a set of default TAs. Each one of the set of the default TAs may correspond to a beam in the source base station. The first default TA may be determined based on the target beam and a source beam in the source base station in which the UE is located and connected with the source base station. In some embodiments, the first default TA is the only TA in the first default TA group.

In some embodiments, TAs in the plurality of default TA groups may be obtained by the target base station by collecting previous TAs used in previous successful handovers.

In some embodiments, the UE may select the target beam from one or more candidate beams for access and determine a default TA for RACH-less access in the target beam based on a beam ID associated with the target beam and the beam associated information in the beam information message.

In some embodiments, the beam information message is transmitted based on RRC signaling or layer one (L1) signaling. In some embodiments, the beam information message may comprise in one of an RRC connection reconfiguration message configured as a handover (HO) command, or a PSCell activation message.

In some embodiments, the first additional related configuration set may comprise at least one of a cyclic prefix (CP) configuration, a UL transmission power configuration, a time-frequency UL transmission resource configuration, one or more demodulation reference signal (DMRS) configurations, or one or more modulation coding scheme (MCS) configurations. In some embodiments, a beam ID of the plurality of beam IDs is one of a SSB ID, or a channel state information (CSI)-reference signal (RS) ID.

Figure 14:
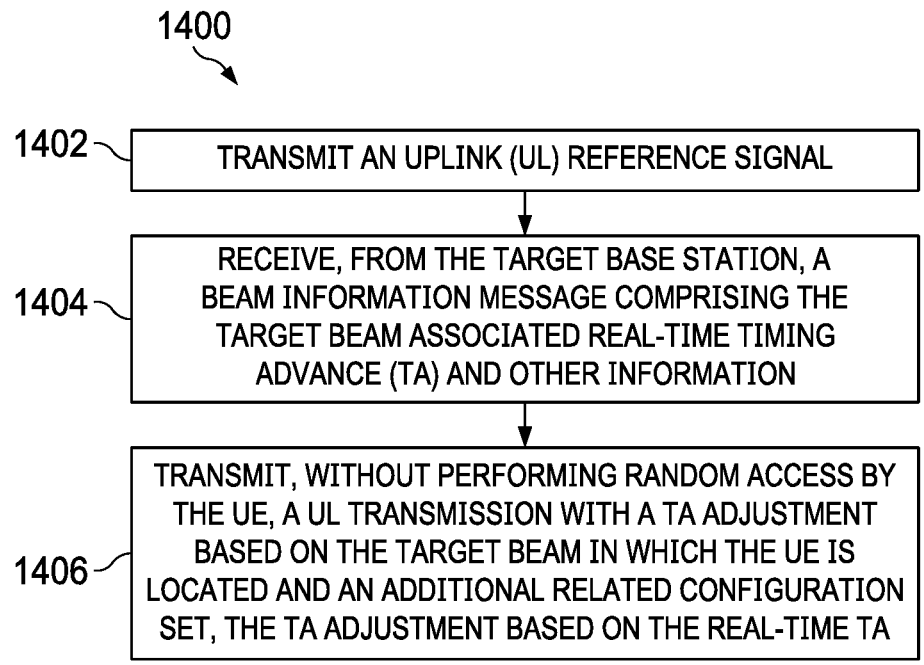
FIG. 14 illustrates a flowchart of a method performed by a UE for RACH-less mobility from a source base station to a target base station, according to some embodiments.

FIG. 14 illustrates a flowchart of a method 1400 performed by a UE for RACH-less mobility from a source base station to a target base station, according to some embodiments. The method 1400 may be carried out or performed by hardware of a UE, such as the UE 120 in FIG. 1. The method 1400 may also be carried out or performed by routines, subroutines, or modules of software executed by one or more processors of the UE. The method 1400 may further be carried out or performed by a combination of hardware and software. Coding of the software for carrying out or performing the method 1400 is well within the scope of a person of ordinary skill in the art having regard to the present disclosure. The method 1400 may include additional or fewer operations than those shown and described and may be carried out or performed in a different order. Computer-readable code or instructions of the software executable by the one or more processor of the UE may be stored on a non-transitory computer-readable medium, such as for example, memory of the UE.

Method 1400 starts at operation 1402, where a UE transmits, a UE uplink (UL) reference signal. At operation 1404, the UE receives, from the target base station, a beam information message. The beam information message comprises beam associated information. The beam associated information indicates a beam identifier (ID) corresponding to a target beam in the target base station, a real-time timing advance (TA) associated with the target beam, and an additional related configuration set. The real-time TA is determined by the target base station based on the UE UL reference signal. The additional related configuration set is associated with the real-time TA.

At operation 1406, the UE transmits, to the target base station without performing random access by the UE to the target base station, a UL transmission with a TA adjustment based on the target beam in which the UE is located and the additional related configuration set in the beam associated information, The TA adjustment is based on the real-time TA associated with the target beam assigned by the target base station to the UE.

In some embodiments, the UE UL reference signal is transmitted to the source base station and listened to by the target base station with configuration of the UE UL reference signal being pre-informed to the target base station.

In some embodiments, the beam information message may be transmitted based on RRC signaling or layer one (L1) signaling. In some embodiments, the beam information message may comprise one of an RRC connection reconfiguration message configured as a handover (HO) command, or a PSCell activation message.

In some embodiments, the additional related configuration set may comprise at least one of a cyclic prefix (CP) configuration, a UL transmission power configuration, a time-frequency UL transmission resource configuration, one or more demodulation reference signal (DMRS) configurations, or one or more modulation coding scheme (MCS) configurations. In some embodiments, the beam ID may be one of a SSB ID, or a channel state information (CSI)-reference signal (RS) ID.

Figure 15:
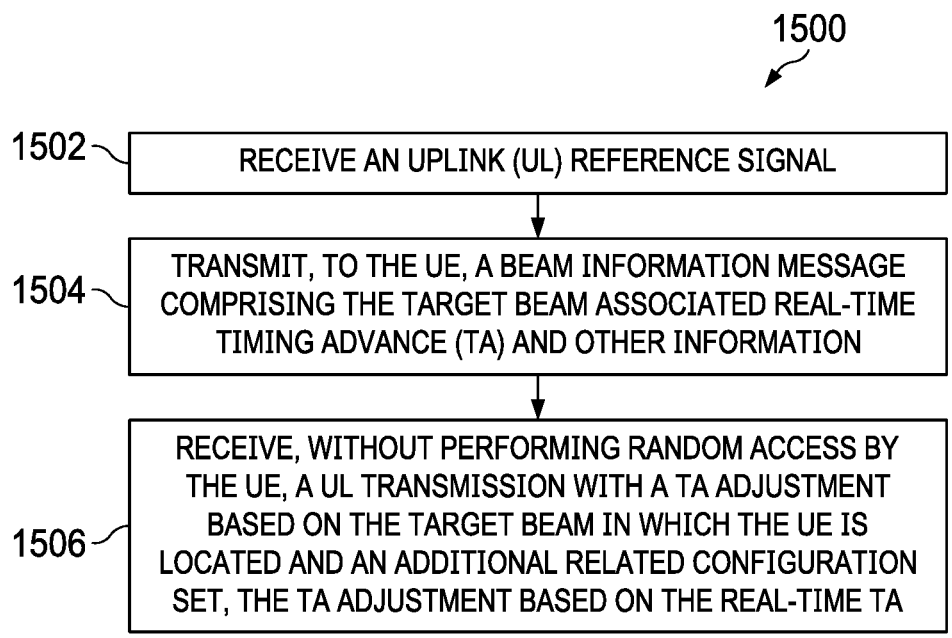
FIG. 15 illustrates a flowchart of a method performed by a target base station for RACH-less mobility from a source base station to the target base station, according to some embodiments.

FIG. 15 illustrates a flowchart of a method 1500 performed by a target base station for RACH-less mobility from a source base station to the target base station, according to some embodiments. The method 1500 may be carried out or performed by hardware of a base station, such as the base station 110 in FIG. 1. The method 1500 may also be carried out or performed by routines, subroutines, or modules of software executed by one or more processors of the base station. The method 1500 may further be carried out or performed by a combination of hardware and software. Coding of the software for carrying out or performing the method 1500 is well within the scope of a person of ordinary skill in the art having regard to the present disclosure. The method 1500 may include additional or fewer operations than those shown and described and may be carried out or performed in a different order. Computer-readable code or instructions of the software executable by the one or more processor of the base station may be stored on a non-transitory computer-readable medium, such as for example, memory of the base station.

Method 1500 starts at operation 1502, where the target base station receives, from a user equipment (UE), a UE uplink (UL) reference signal. At operation 1504, the target base station transmits, to the UE, a beam information message. The beam information message comprises beam associated information. The beam associated information indicates a beam identifier (ID) corresponding to a target beam in the target base station, a real-time timing advance (TA) associated with the target beam, and an additional related configuration set. The real-time TA is determined by the target base station based on the UE UL reference signal. The additional related configuration set is associated with the real-time TA.

At operation 1506, the target base station receives, from the UE without performing random access by the UE, a UL transmission with a TA adjustment based on the target beam in which the UE is located and the additional related configuration set in the beam associated information, The TA adjustment is based on the real-time TA associated with the target beam assigned by the target base station to the UE.

In some embodiments, the UE UL reference signal may be transmitted to the source base station and listened to by the target base station with configuration of the UE UL reference signal being pre-informed to the target base station.

In some embodiments, the beam information message may be transmitted based on RRC signaling or layer one (L1) signaling. In some embodiments, the beam information message may comprise one of an RRC connection reconfiguration message configured as a handover (HO) command, or a PSCell activation message.

In some embodiments, the additional related configuration set may comprise at least one of a cyclic prefix (CP) configuration, a UL transmission power configuration, a time-frequency UL transmission resource configuration, one or more demodulation reference signal (DMRS) configurations, or one or more modulation coding scheme (MCS) configurations. In some embodiments, the beam ID may be one of a SSB ID, or a channel state information (CSI)-reference signal (RS) ID.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for random-access channel (RACH)-less mobility from a source base station to a target base station, the method comprising:
receiving, by a user equipment (UE) from the source base station, a beam information message comprising beam associated information, the beam associated information indicating a plurality of beam identifiers (IDs) corresponding to a plurality of beams in the target base station, a plurality of default timing advance (TA) groups, and a plurality of additional related configuration sets, wherein each default TA group of the plurality of default TA groups is associated with a beam of the plurality of beams in the target base station and an additional related configuration set of the plurality of the additional related configuration sets; and
transmitting, to the target base station without performing random access by the UE to the target base station, an uplink (UL) transmission with a TA adjustment based on a target beam of the plurality of beams in which the UE is located and a first additional related configuration set of the plurality of additional related configuration sets, wherein the TA adjustment is based on a first default TA of a first default TA group associated with the target beam, and wherein the first additional related configuration set is associated with the first default TA.

2. The method of claim 1, wherein the first default TA group associated with the target beam comprises a set of default TAs, and each one of the set of the default TAs corresponds to a beam in the source base station, the method further comprising:
determining, by the UE, the first default TA based on the target beam and a source beam in the source base station in which the UE is located and connected with the source base station.

3. The method of claim 1, wherein the first default TA is the only TA in the first default TA group.

4. The method of claim 1, wherein TAs in the plurality of default TA groups are obtained by the target base station by collecting previous TAs used in previous successful handovers.

5. The method of claim 1, further comprising:
selecting, by the UE, the target beam from one or more candidate beams for access; and
determining, by the UE, the first default TA for RACH-less access in the target beam based on a beam ID associated with the target beam and the beam associated information in the beam information message.

6. The method of claim 1, wherein the beam information message is transmitted based on RRC signaling or layer one (L1) signaling.

7. The method of claim 1, wherein the beam information message comprises one of an RRC connection reconfiguration message configured as a handover (HO) command, or a PSCell activation message.

8. The method of claim 1, wherein the first additional related configuration set comprises at least one of:
a cyclic prefix (CP) configuration, a UL transmission power configuration, a time-frequency UL transmission resource configuration, one or more demodulation reference signal (DMRS) configurations, or one or more modulation coding scheme (MCS) configurations.

9. The method of claim 1, wherein a beam ID of the plurality of beam IDs is one of a SSB ID, or a channel state information (CSI)-reference signal (RS) ID.

10. A method for random-access channel (RACH)-less mobility from a source base station to a target base station, the method comprising:
transmitting, by the target base station to the source base station, beam associated information, the beam associated information indicating a plurality of beam identifiers (IDs) corresponding to a plurality of beams in the target base station, a plurality of default timing advance (TA) groups, and a plurality of additional related configuration sets, wherein each default TA group of the plurality of default TA groups is associated with a beam of the plurality of beams in the target base station and an additional related configuration set of the plurality of the additional related configuration sets; and
receiving, by the target base station from a user equipment (UE) without performing random access by the UE, an uplink (UL) transmission with a TA adjustment based on a target beam of the plurality of beams in which the UE is located and a first additional related configuration set of the plurality of additional related configuration sets, wherein the TA adjustment is based on a first default TA of a first default TA group associated with the target beam, and wherein the first additional related configuration set is associated with the first default TA.

11. The method of claim 10, wherein the first default TA group associated with the target beam comprises a set of default TAs, and each one of the set of the default TAs corresponds to a beam in the source base station, and wherein the first default TA is determined based on the target beam and a source beam in the source base station in which the UE is located and connected with the source base station.

12. The method of claim 10, wherein the first default TA is the only TA in the first default TA group.

13. The method of claim 10, wherein TAs in the plurality of default TA groups are obtained by the target base station by collecting previous TAs used in previous successful handovers.

14. The method of claim 10, wherein the UE selects the target beam from one or more candidate beams for access and determines a default TA for RACH-less access in the target beam based on a beam ID associated with the target beam and the beam associated information in a beam information message transmitted from the source base station to the UE.

15. The method of claim 10, wherein a beam information message is transmitted from the source base station to the UE in one of a handover (HO) request acknowledgement message or a PSCell addition acknowledgement message to the source base station.

16. The method of claim 10, wherein the first additional related configuration set comprises at least one of:
a cyclic prefix (CP) configuration, a UL transmission power configuration, a time-frequency UL transmission resource configuration, one or more demodulation reference signal (DMRS) configurations, or one or more modulation coding scheme (MCS) configurations.

17. The method of claim 10, wherein a beam ID of the plurality of beam IDs is one of a SSB ID, or a channel state information (CSI)-reference signal (RS) ID.

18. A method for random-access channel (RACH)-less mobility from a source base station to a target base station, the method comprising:
receiving, by the source base station from the target base station, beam associated information, the beam associated information indicating a plurality of beam identifiers (IDs) corresponding to a plurality of beams in the target base station, a plurality of default timing advance (TA) groups, and a plurality of additional related configuration sets, wherein each default TA group of the plurality of default TA groups is associated with a beam of the plurality of beams in the target base station and an additional related configuration set of the plurality of the additional related configuration sets; and
transmitting, by the source base station to a user equipment (UE), a beam information message comprising the beam associated information, wherein the UE, without performing random access, transmits to the target base station, an uplink (UL) transmission with a TA adjustment based on a target beam of the plurality of beams in which the UE is located and a first additional related configuration set of the plurality of additional related configuration sets, wherein the TA adjustment is based on a first default TA of a first default TA group associated with the target beam, and wherein the first additional related configuration set is associated with the first default TA.

19. The method of claim 18, wherein the first default TA group associated with the target beam comprises a set of default TAs, and each one of the set of the default TAs corresponds to a beam in the source base station, and wherein the first default TA is determined based on the target beam and a source beam in the source base station in which the UE is located and connected with the source base station.

20. The method of claim 18, wherein the first default TA is the only TA in the first default TA group.

21. The method of claim 18, wherein TAs in the plurality of default TA groups are obtained by the target base station by collecting previous TAs used in previous successful handovers.

22. The method of claim 18, wherein the UE selects the target beam from one or more candidate beams for access and determines a default TA for RACH-less access in the target beam based on a beam ID associated with the target beam and the beam associated information in the beam information message.

23. The method of claim 18, wherein the beam information message is transmitted based on RRC signaling or layer one (L1) signaling.

24. The method of claim 18, wherein the beam information message comprises in one of an RRC connection reconfiguration message configured as a handover (HO) command, or a PSCell activation message.

25. The method of claim 18, wherein the first additional related configuration set comprises at least one of:
a cyclic prefix (CP) configuration, a UL transmission power configuration, a time-frequency UL transmission resource configuration, one or more demodulation reference signal (DMRS) configurations, or one or more modulation coding scheme (MCS) configurations.

26. The method of claim 18, wherein a beam ID of the plurality of beam IDs is one of a SSB ID, or a channel state information (CSI)-reference signal (RS) ID.

27. The method of claim 18, wherein the beam information message is received by the source base station in one of a handover (HO) request acknowledgement message or a PSCell addition acknowledgement message.

28. A user equipment (UE), comprising:
a processor; and
a non-transitory computer readable storage medium storing programming for execution by the processor, the programming comprising instructions for:
receiving, from a source base station, a beam information message comprising beam associated information, the beam associated information indicating a plurality of beam identifiers (IDs) corresponding to a plurality of beams in a target base station, a plurality of default timing advance (TA) groups, and a plurality of additional related configuration sets, wherein each default TA group of the plurality of default TA groups is associated with a beam of the plurality of beams in the target base station and an additional related configuration set of the plurality of the additional related configuration sets; and
transmitting, without performing random access by the UE to the target base station, an uplink (UL) transmission with a TA adjustment based on a target beam of the plurality of beams in which the UE is located and a first additional related configuration set of the plurality of additional related configuration sets, wherein the TA adjustment is based on a first default TA of a first default TA group associated with the target beam, and wherein the first additional related configuration set is associated with the first default TA.

29. The UE of claim 28, wherein the first default TA group associated with the target beam comprises a set of default TAs, and each one of the set of the default TAs corresponds to a beam in the source base station, the programming further comprising instructions for:
determining the first default TA based on the target beam and a source beam in the source base station in which the UE is located and connected with the source base station.

30. The UE of claim 28, wherein the first default TA is the only TA in the first default TA group.

31. The UE of claim 28, wherein TAs in the plurality of default TA groups are obtained by the target base station by collecting previous TAs used in previous successful handovers.

32. The UE of claim 28, the programming further comprising instructions for:

selecting the target beam from one or more candidate beams for access; and determining a default TA for RACH-less access in the target beam based on a beam ID associated with the target beam and the beam associated information in the beam information message.

33. The UE of claim 28, wherein the beam information message is transmitted based on RRC signaling or layer one (L1) signaling.

34. The UE of claim 28, wherein the beam information message comprises one of an RRC connection reconfiguration message configured as a handover (HO) command, or a PSCell activation message.

35. The UE of claim 28, wherein the first additional related configuration set comprises at least one of:
a cyclic prefix (CP) configuration, a UL transmission power configuration, a time-frequency UL transmission resource configuration, one or more demodulation reference signal (DMRS) configurations, or one or more modulation coding scheme (MCS) configurations.

36. The UE of claim 28, wherein a beam ID of the plurality of beam IDs is one of a SSB ID, or a channel state information (CSI)-reference signal (RS) ID.

37. A target base station, comprising:
a processor; and
a non-transitory computer readable storage medium storing programming for execution by the processor, the programming comprising instructions for:
transmitting, to a source base station, beam associated information, the beam associated information indicating a plurality of beam identifiers (IDs) corresponding to a plurality of beams in the target base station, a plurality of default timing advance (TA) groups, and a plurality of additional related configuration sets, wherein each default TA group of the plurality of default TA groups is associated with a beam of the plurality of beams in the target base station and an additional related configuration set of the plurality of the additional related configuration sets; and
receiving, from a user equipment (UE) without performing random access by the UE, an uplink (UL) transmission with a TA adjustment based on a target beam of the plurality of beams in which the UE is located and a first additional related configuration set of the plurality of additional related configuration sets, wherein the TA adjustment is based on a first default TA of a first default TA group associated with the target beam, and wherein the first additional related configuration set is associated with the first default TA.

38. The target base station of claim 37, wherein the first default TA group associated with the target beam comprises a set of default TAs, and each one of the set of the default TAs corresponds to a beam in the source base station, and wherein the first default TA is determined based on the target beam and a source beam in the source base station in which the UE is located and connected with the source base station.

39. The target base station of claim 37, wherein the first default TA is the only TA in the first default TA group.

40. The target base station of claim 37, wherein TAs in the plurality of default TA groups are obtained by the target base station by collecting previous TAs used in previous successful handovers.

41. The target base station of claim 37, wherein the UE selects the target beam from one or more candidate beams for access and determines a default TA for RACH-less access in the target beam based on a beam ID associated with the target beam and the beam associated information in a beam information message transmitted from the source base station to the UE.

42. The target base station of claim 37, wherein a beam information message is transmitted from the source base station to the UE in one of a handover (HO) request acknowledgement message or a PSCell addition acknowledgement message to the source base station.

43. The target base station of claim 37, wherein the first additional related configuration set comprises at least one of:
a cyclic prefix (CP) configuration, a UL transmission power configuration, a time-frequency UL transmission resource configuration, one or more demodulation reference signal (DMRS) configurations, or one or more modulation coding scheme (MCS) configurations.

44. The target base station of claim 37, wherein a beam ID of the plurality of beam IDs is one of a SSB ID, or a channel state information (CSI)-reference signal (RS) ID.

45. A source base station, comprising:
a processor; and
a non-transitory computer readable storage medium storing programming for execution by the processor, the programming comprising instructions for:
receiving, from a target base station, beam associated information, the beam associated information indicating a plurality of beam identifiers (IDs) corresponding to a plurality of beams in the target base station, a plurality of default timing advance (TA) groups, and a plurality of additional related configuration sets, wherein each default TA group of the plurality of default TA groups is associated with a beam of the plurality of beams in the target base station and an additional related configuration set of the plurality of the additional related configuration sets; and
transmitting, to a user equipment (UE), a beam information message comprising the beam associated information, wherein the UE, without performing random access, transmits to the target base station, an uplink (UL) transmission with a TA adjustment based on a target beam of the plurality of beams in which the UE is located and a first additional related configuration set of the plurality of additional related configuration sets, wherein the TA adjustment is based on a first default TA of a first default TA group associated with the target beam, and wherein the first additional related configuration set is associated with the first default TA.

46. The source base station of claim 45, wherein the first default TA group associated with the target beam comprises a set of default TAs, and each one of the set of the default TAs corresponds to a beam in the source base station, and wherein the first default TA is determined based on the target beam and a source beam in the source base station in which the UE is located and connected with the source base station.

47. The source base station of claim 45, wherein the first default TA is the only TA in the first default TA group.

48. The source base station of claim 45, wherein TAs in the plurality of default TA groups are obtained by the target base station by collecting previous TAs used in previous successful handovers.

49. The source base station of claim 45, wherein the UE selects the target beam from one or more candidate beams for access and determines a default TA for RACH-less access in the target beam based on a beam ID associated with the target beam and the beam associated information in the beam information message.

50. The source base station of claim 45, wherein the beam information message is transmitted based on RRC signaling or layer one (L1) signaling.

51. The source base station of claim 45, wherein the beam information message comprises in one of an RRC connection reconfiguration message configured as a handover (HO) command, or a PSCell activation message.

52. The source base station of claim 45, wherein the first additional related configuration set comprises at least one of:
a cyclic prefix (CP) configuration, a UL transmission power configuration, a time-frequency UL transmission resource configuration, one or more demodulation reference signal (DMRS) configurations, or one or more modulation coding scheme (MCS) configurations.

53. The source base station of claim 45, wherein a beam ID of the plurality of beam IDs is one of a SSB ID, or a channel state information (CSI)-reference signal (RS) ID.

54. The source base station of claim 45, wherein the beam information message is received by the source base station in one of a handover (HO) request acknowledgement message or a PSCell addition acknowledgement message.

55. A method for random-access channel (RACH)-less mobility from a source base station to a target base station, the method comprising:
transmitting, by a user equipment (UE), a UE uplink (UL) reference signal;
receiving, by the UE from the target base station, a beam information message comprising beam associated information, the beam associated information indicating a beam identifier (ID) corresponding to a target beam in the target base station, a real-time timing advance (TA) associated with the target beam, and an additional related configuration set, wherein the real-time TA is determined by the target base station based on the UE UL reference signal, and wherein the additional related configuration set is associated with the real-time TA; and
transmitting, to the target base station without performing random access by the UE to the target base station, a UL transmission with a TA adjustment based on the target beam in which the UE is located and the additional related configuration set in the beam associated information, wherein the TA adjustment is based on the real-time TA associated with the target beam assigned by the target base station to the UE.

56. The method of claim 55, wherein the UE UL reference signal is transmitted to the source base station and listened to by the target base station with configuration of the UE UL reference signal being pre-informed to the target base station.

57. The method of claim 55, wherein the beam information message is transmitted based on RRC signaling or layer one (L1) signaling.

58. The method of claim 55, wherein the beam information message comprises one of an RRC connection reconfiguration message configured as a handover (HO) command, or a PSCell activation message.

59. The method of claim 55, wherein the additional related configuration set comprises at least one of:
a cyclic prefix (CP) configuration, a UL transmission power configuration, a time-frequency UL transmission resource configuration, one or more demodulation reference signal (DMRS) configurations, or one or more modulation coding scheme (MCS) configurations.

60. The method of claim 55, wherein the beam ID is one of a SSB ID, or a channel state information (CSI)-reference signal (RS) ID.

61. A method for random-access channel (RACH)-less mobility from a source base station to a target base station, the method comprising:
receiving, by the target base station from a user equipment (UE), a UE uplink (UL) reference signal;
transmitting, by the target base station to the UE, a beam information message comprising beam associated information, the beam associated information indicating a beam identifier (ID) corresponding to a target beam in the target base station, a real-time timing advance (TA) associated with the target beam, and an additional related configuration set, wherein the real-time TA is determined by the target base station based on the UE UL reference signal, and wherein the additional related configuration set is associated with the real-time TA; and
receiving, by the target base station from the UE without performing random access by the UE, a UL transmission with a TA adjustment based on the target beam in which the UE is located and the additional related configuration set in the beam associated information, wherein the TA adjustment is based on the real-time TA associated with the target beam assigned by the target base station to the UE.

62. The method of claim 61, wherein the UE UL reference signal is transmitted to the source base station and listened to by the target base station with configuration of the UE UL reference signal being pre-informed to the target base station.

63. The method of claim 61, wherein the beam information message is transmitted based on RRC signaling or layer one (L1) signaling.

64. The method of claim 61, wherein the beam information message comprises one of an RRC connection reconfiguration message configured as a handover (HO) command, or a PSCell activation message.

65. The method of claim 61, wherein the additional related configuration set comprises:
a cyclic prefix (CP) configuration, a UL transmission power configuration, a time-frequency UL transmission resource configuration, one or more demodulation reference signal (DMRS) configurations, or one or more modulation coding scheme (MCS) configurations.

66. The method of claim 61, wherein the beam ID is one of a SSB ID, or a channel state information (CSI)-reference signal (RS) ID.

67. A user equipment (UE), comprising:
a processor; and
a non-transitory computer readable storage medium storing programming for execution by the processor, the programming comprising instructions for:
transmitting UE uplink (UL) a reference signal;
receiving, from a target base station, a beam information message comprising beam associated information, the beam associated information indicating a beam identifier (ID) corresponding to a target beam in the target base station, a real-time timing advance (TA) associated with the target beam, and an additional related configuration set, wherein the real-time TA is determined by the target base station based on the UE UL reference signal, and wherein the additional related configuration set is associated with the real-time TA; and transmitting, to the target base station without performing random access by the UE to the target base station, a UL transmission with a TA adjustment based on the target beam in which the UE is located and the additional related configuration set in the beam associated information, wherein the TA adjustment is based on the real-time TA associated with the target beam assigned by the target base station to the UE.

68. The UE of claim 67, wherein the UE UL reference signal is transmitted to a source base station and listened to by the target base station with configuration of the UE UL reference signal being pre-informed to the target base station.

69. The UE of claim 67, wherein the beam information message is transmitted based on RRC signaling or layer one (L1) signaling.

70. The UE of claim 67, wherein the beam information message comprises one of an RRC connection reconfiguration message configured as a handover (HO) command, or a PSCell activation message.

71. The UE of claim 67, wherein the additional related configuration set comprises at least one of:
a cyclic prefix (CP) configuration, a UL transmission power configuration, a time-frequency UL transmission resource configuration, one or more demodulation reference signal (DMRS) configurations, or one or more modulation coding scheme (MCS) configurations.

72. The UE of claim 67, wherein the beam ID is one of a SSB ID, or a channel state information (CSI)-reference signal (RS) ID.

73. A target base station, comprising:
a processor; and
a non-transitory computer readable storage medium storing programming for execution by the processor, the programming comprising instructions for:
receiving, from a user equipment (UE), a UE uplink (UL) reference signal;
transmitting, to the UE, a beam information message comprising beam associated information, the beam associated information indicating a beam identifier (ID) corresponding to a target beam in the target base station, a real-time timing advance (TA) associated with the target beam, and an additional related configuration set, wherein the real-time TA is determined by the target base station based on the UE UL reference signal, and wherein the additional related configuration set is associated with the real-time TA; and
receiving, from the UE without performing random access by the UE, a UL transmission with a TA adjustment based on the target beam in which the UE is located and the additional related configuration set in the beam associated information, wherein the TA adjustment is based on the real-time TA associated with the target beam assigned by the target base station to the UE.

74. The target base station of claim 73, wherein the UE UL reference signal is transmitted to a source base station and listened to by the target base station with configuration of the UE UL reference signal being pre-informed to the target base station.

75. The target base station of claim 73, wherein the beam information message is transmitted based on RRC signaling or layer one (L1) signaling.

76. The target base station of claim 73, wherein the beam information message comprises one of an RRC connection reconfiguration message configured as a handover (HO) command, or a PSCell activation message.

77. The target base station of claim 73, wherein the additional related configuration set comprises at least one of:
a cyclic prefix (CP) configuration, a UL transmission power configuration, a time-frequency UL transmission resource configuration, one or more demodulation reference signal (DMRS) configurations, or one or more modulation coding scheme (MCS) configurations.

78. The target base station of claim 73, wherein the beam ID is one of a SSB ID, or a channel state information (CSI)-reference signal (RS) ID.

* * * * *